(12) United States Patent
Nakamura et al.

(10) Patent No.: US 11,274,638 B2
(45) Date of Patent: Mar. 15, 2022

(54) FLUID HEATING DEVICE, MOTOR SYSTEM, MOVABLE OBJECT, AND HYDRAULIC SYSTEM

(71) Applicant: PANASONIC INTELLECTUAL PROPERTY MANAGEMENT CO., LTD., Osaka (JP)

(72) Inventors: Yoshitaka Nakamura, Osaka (JP); Kentaro Shii, Osaka (JP); Kou Sugano, Osaka (JP); Tatsuya Nakamura, Osaka (JP); Yusuke Ogihara, Osaka (JP); Ryuichi Ozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/262,123

(22) PCT Filed: Jun. 21, 2019

(86) PCT No.: PCT/JP2019/024764
§ 371 (c)(1),
(2) Date: Jan. 21, 2021

(87) PCT Pub. No.: WO2020/021928
PCT Pub. Date: Jan. 30, 2020

(65) Prior Publication Data
US 2021/0301770 A1    Sep. 30, 2021

(30) Foreign Application Priority Data

Jul. 24, 2018 (JP) ............................. JP2018-138683

(51) Int. Cl.
*F02M 31/16* (2006.01)
*F02M 55/02* (2006.01)
*F15B 15/20* (2006.01)

(52) U.S. Cl.
CPC .......... *F02M 31/16* (2013.01); *F02M 55/025* (2013.01); *F15B 15/20* (2013.01); *F15B 2211/62* (2013.01)

(58) Field of Classification Search
CPC ...... F02M 31/16; F02M 55/025; F02B 15/20; F15B 2211/62
(Continued)

(56) References Cited

U.S. PATENT DOCUMENTS 6,234,789 B1    5/2001  Miyata
2012/0312279 A1*  12/2012  Powell ................. F28D 20/025
                                                                123/456

(Continued)

FOREIGN PATENT DOCUMENTS

DE    102007041095 A1 *  3/2009  ............ C09K 5/063
JP    S58-186159 U    12/1983
(Continued)

OTHER PUBLICATIONS

DE102007041095A1 (Stach, Thomas) (Mar. 5, 2009)(machine translation), retrieved from EPO website on Aug. 4, 2021. (Year: 2009).*
(Continued)

*Primary Examiner* — Mahmoud Gimie
(74) *Attorney, Agent, or Firm* — McDermott Will and Emery LLLP

(57) ABSTRACT

A fluid heating device includes a pressurizing chamber configured to store a working fluid and a heat accumulator disposed in the pressurizing chamber. The heat accumulator includes a heat accumulating member configured to release
(Continued)

heat by receiving a pressure applied to the working fluid. The fluid heating device has improved actuation efficiency.

14 Claims, 4 Drawing Sheets

(58) Field of Classification Search
USPC .......................................................... 123/557
See application file for complete search history.

(56) References Cited

U.S. PATENT DOCUMENTS

| | | | |
|---|---|---|---|
| 2016/0237331 A1 | 8/2016 | Ohkoshi et al. | |
| 2017/0235260 A1* | 8/2017 | Shibuya | G03G 15/50 399/67 |
| 2017/0350659 A1 | 12/2017 | Honda et al. | |
| 2018/0120036 A1* | 5/2018 | Okamura | C25D 5/34 |
| 2019/0048243 A1 | 2/2019 | Ohkoshi et al. | |

FOREIGN PATENT DOCUMENTS

| | | |
|---|---|---|
| JP | H06-050121 A | 2/1994 |
| JP | H11-094239 A | 4/1999 |
| JP | 2006-316775 A | 11/2006 |
| JP | 2009-275544 A | 11/2009 |
| JP | 2010-121520 A | 6/2010 |
| JP | 2013-108508 A | 6/2013 |
| JP | 2013-181397 A | 9/2013 |
| JP | 2015-203340 A | 11/2015 |
| JP | 2017-096109 A | 6/2017 |
| JP | 2017-166729 A | 9/2017 |
| JP | 2017-218971 A | 12/2017 |
| JP | 2018-003616 A | 1/2018 |
| JP | 2018-062906 A | 4/2018 |
| WO | 2015/050269 A1 | 4/2015 |

OTHER PUBLICATIONS

International Search Report and Written Opinion issued in International Patent Application No. PCT/JP2019/024764, dated Aug. 20, 2019; with partial English translation.
Notice of Reasons for Refusal issued in Japanese Patent Application No. 2020-532223, dated Nov. 2, 2021; with English translation.

* cited by examiner

FLUID HEATING DEVICE, MOTOR SYSTEM, MOVABLE OBJECT, AND HYDRAULIC SYSTEM

CROSS-REFERENCE OF RELATED APPLICATIONS

This application is the U.S. National Phase under 35 U.S.C. § 371 of International Patent Application No. PCT/JP2019/024764, filed on Jun. 21, 2019, which in turn claims the benefit of Japanese Application No. 2018-138683, filed on Jul. 24, 2018, the entire disclosures of which Applications are incorporated by reference herein.

TECHNICAL FIELD

The present disclosure relates to fluid heating devices, motor systems, movable objects, and hydraulic systems. Specifically, the present disclosure relates to a fluid heating device for heating a working fluid, a motor system including the fluid heating device, a movable object including the motor system, and a hydraulic system including the fluid heating device.

BACKGROUND ART

A heating system configured to heat a fuel to be supplied to an engine or the like uses a latent heat storage material as a heat source.

For example, Patent Literature 1 describes a latent heat storage device having a latent heat storage material accommodation chamber formed around a fuel supply path of a fuel to be supplied to an internal-combustion engine and proposes that a latent heat storage material is stored in the latent heat storage material accommodation chamber. When in the latent heat storage device, for example, the internal-combustion engine is a diesel engine including a common rail, the latent heat storage material accommodation chamber is formed around the common rail. In the latent heat storage device, the action of the latent heat storage material enables the temperature of the fuel to be supplied into a cylinder of the internal-combustion engine to be increased early and satisfactory startability of the engine to be secured.

CITATION LIST

Patent Literature

Patent Literature 1: JP 2009-275544 A

SUMMARY OF INVENTION

A fluid heating device includes a pressurizing chamber configured to store a working fluid and a heat accumulator disposed in the pressurizing chamber. The heat accumulator includes a heat accumulating member configured to release heat by receiving a pressure applied to the working fluid.

The fluid heating device can be improved in actuation efficiency.

A motor system according to an aspect of the present disclosure includes the fluid heating device and an internal-combustion engine.

A movable object according to another aspect of the present disclosure includes the motor system.

A hydraulic system according to still another aspect of the present disclosure includes the fluid heating device. The working fluid in the fluid heating device is a hydraulic oil.

DESCRIPTION OF EMBODIMENTS (1) Schema

Figure 1A:
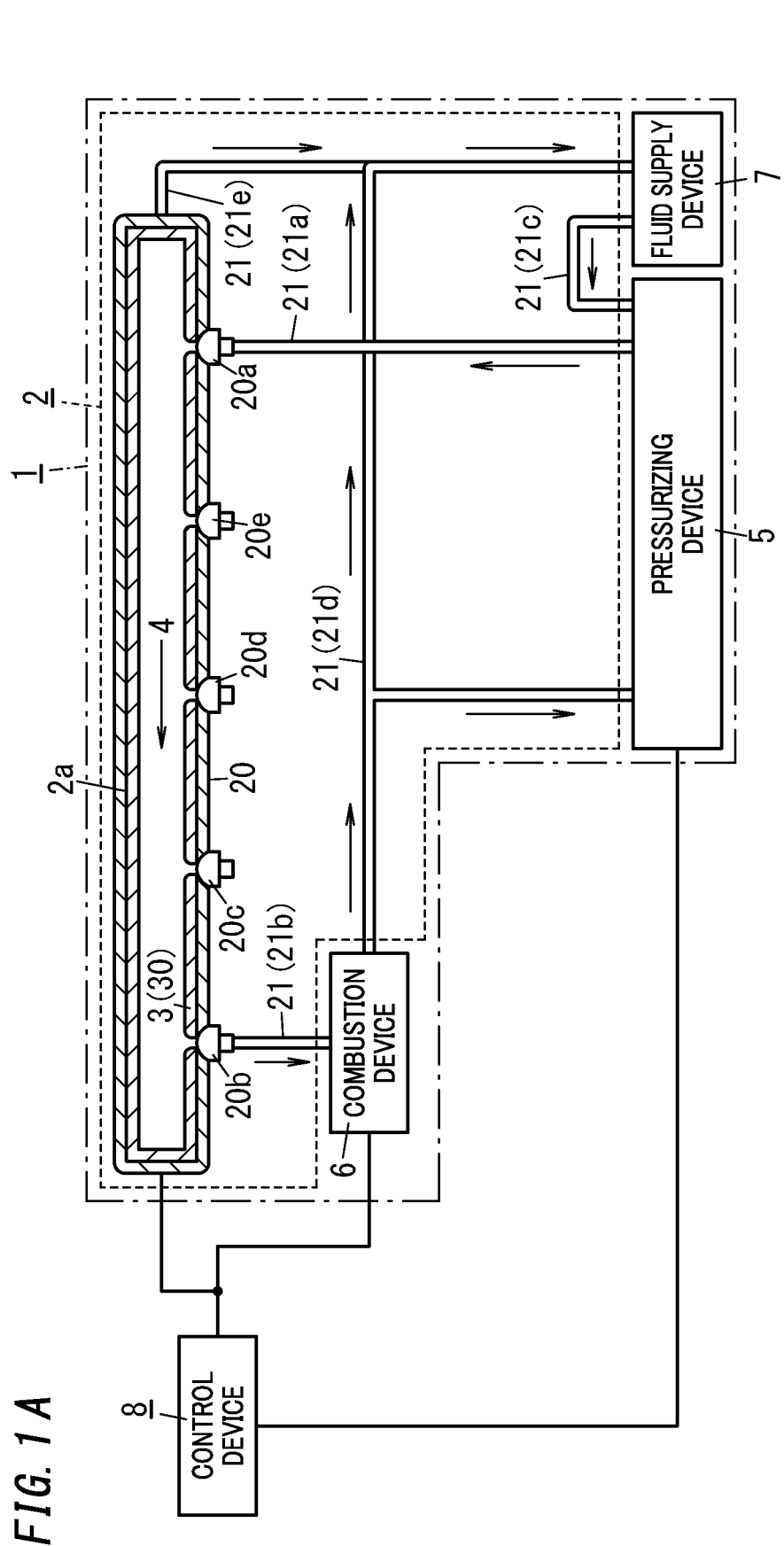
FIG. 1A is a view schematically illustrating a fluid heating device according to an embodiment.

FIG. 1A is a view schematically illustrating a fluid heating device 1 according to an embodiment. The fluid heating device 1 according to the present embodiment includes: a pressurizing chamber 2 configured to store a working fluid 4; and a heat accumulator 3. The heat accumulator 3 is disposed in the pressurizing chamber 2. The heat accumulator 3 includes a heat accumulating member 30, and the heat accumulating member 30 releases heat by receiving a pressure applied to the working fluid 4.

Figure 1B:
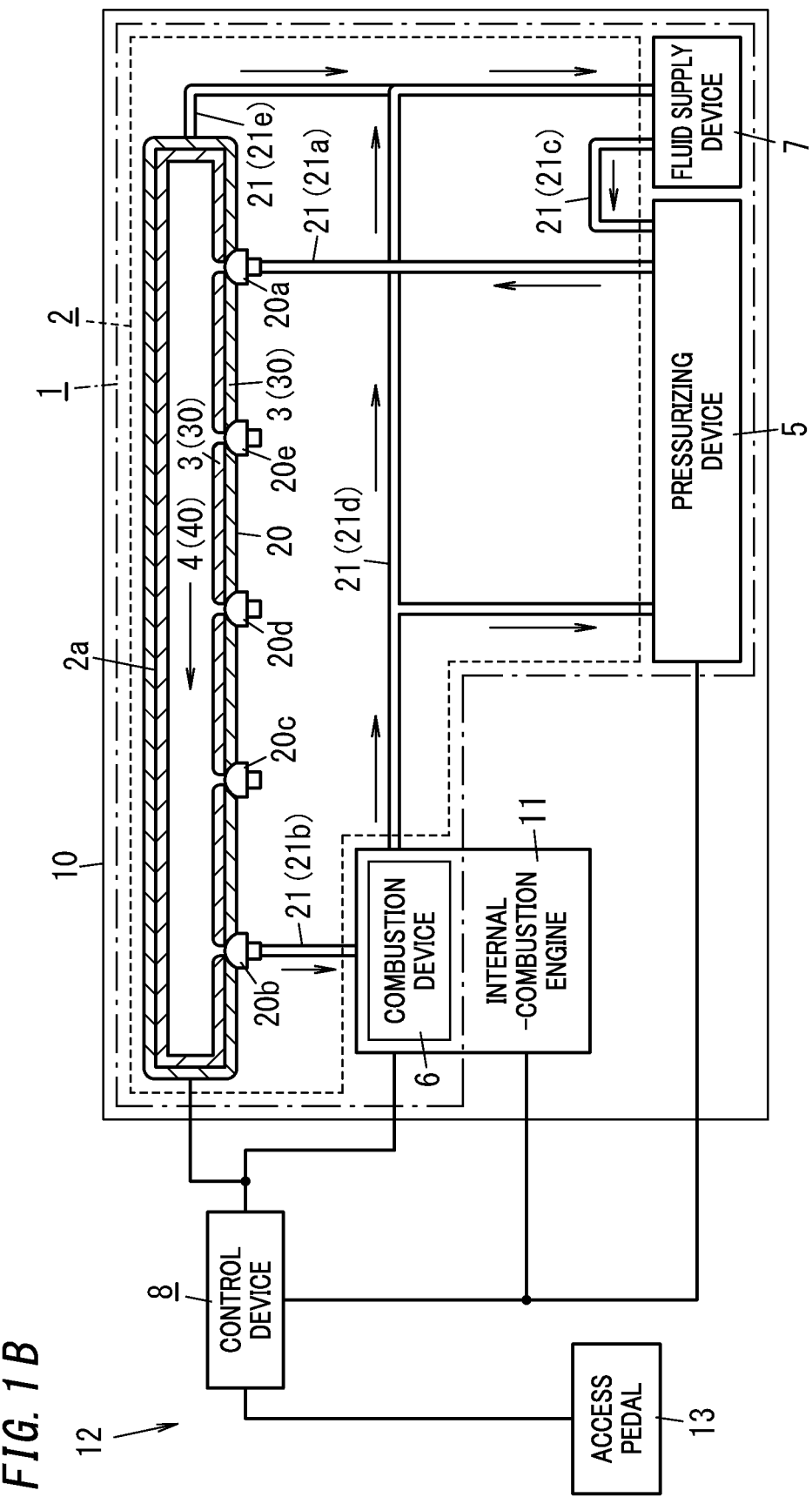
FIG. 1B is a view schematically illustrating a motor system including the fluid heating device according to the embodiment.

FIG. 1B is a view schematically illustrating a motor system 10 including the fluid heating device 1 according to the embodiment. The fluid heating device 1, together with an internal-combustion engine 11, forms the motor system 10. The motor system 10 is provided to, for example, a movable object 12 such as a vehicle, a marine vessel, an aircraft, a construction machine, or an agricultural machine.

Figure 1C:
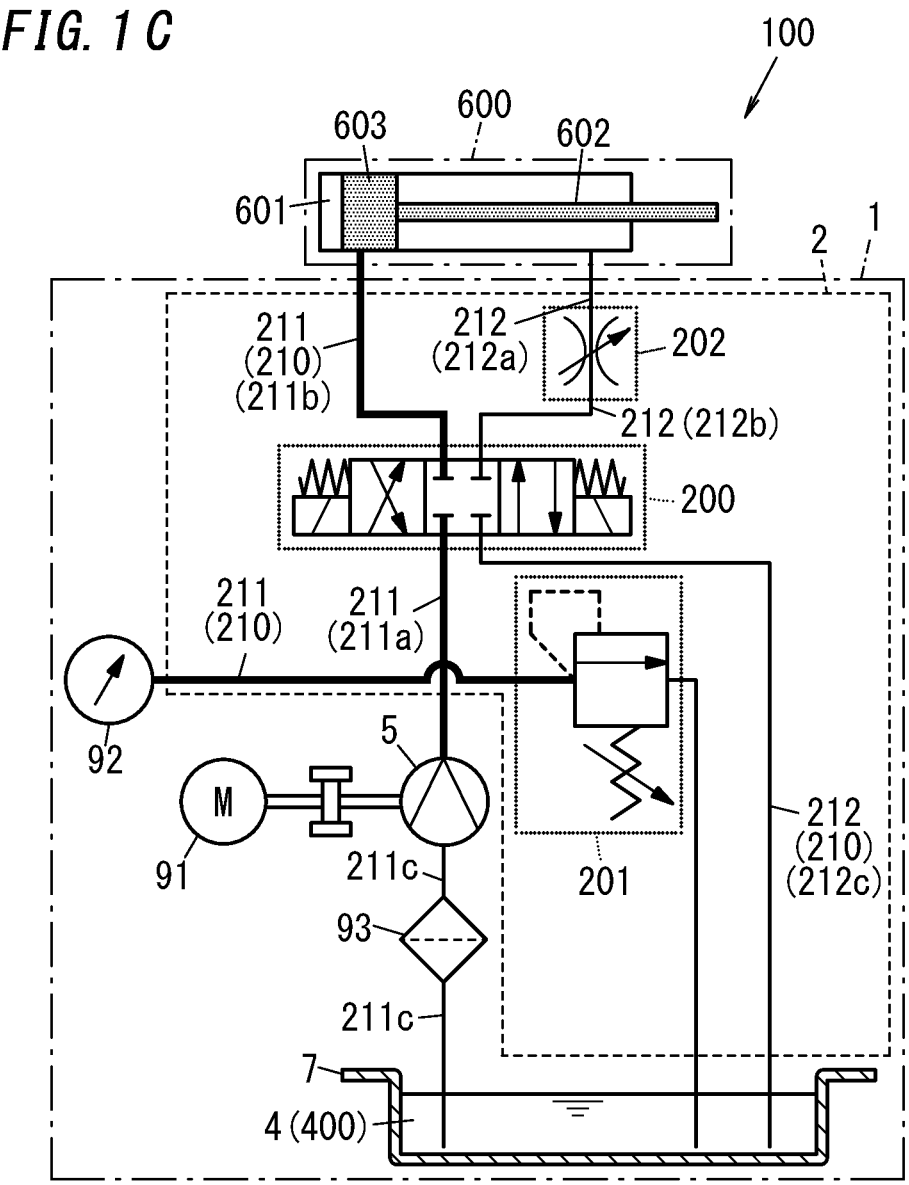
FIG. 1C is a circuit diagram schematically illustrating a hydraulic system including the fluid heating device according to the embodiment.

FIG. 1C is a circuit diagram schematically illustrating a hydraulic system including the fluid heating device according to the embodiment. The fluid heating device 1 is included in a hydraulic system 100 in which the working fluid 4 is a hydraulic oil 400.

The fluid heating device 1 according to the present embodiment is configured to, when the working fluid 4 flows within the pressurizing chamber 2, apply a pressure via the working fluid 4 to the heat accumulator 3 disposed in the pressurizing chamber 2. The heat accumulator 3 receives the pressure, and thereby, the heat accumulating member 30 forming the heat accumulator 3 releases heat. In the pressurizing chamber 2, the working fluid 4 is located around the heat accumulator 3 and abuts the heat accumulator 3. Thus, in the fluid heating device 1, the heat generated from the heat accumulator 3 can be given to the working fluid 4. Thus, in the fluid heating device 1, improving heat transmission to the working fluid 4 can reduce heat loss. Moreover, in the fluid heating device 1, the pressure can be efficiently applied from the working fluid 4 to the heat accumulator 3, which can make the temperature of the working fluid 4 less likely to decrease. This makes the viscosity of the working fluid 4 less likely to increase, which can improve the flowability of the working fluid 4. Thus, also when the fluid heating device 1 is provided, for example, to a motor, the motor system 10 including the motor, and the hydraulic system 100 such as a fluid pressure device, the fluid heating device 1 can be improved in actuation efficiency, thereby yielding good operating performance.

In the latent heat storage device described in Patent Literature 1, the latent heat storage material in an excessively cooled state has to be subjected to a nucleation operation to generate heat, and after the heat is generated, the heat has to be received by a cooling water path or the like provided for cooling so as to return the latent heat storage material to be in the excessively cooled state. In this case, since cooling water removes part of heat from the latent heat storage material before nucleation, improving the actuation efficiency of the latent heat storage device is difficult.

(2) Details

The fluid heating device 1 according to the present embodiment, the motor system 10 including the fluid heating device 1, the movable object 12 including the motor system 10, and the hydraulic system 100 including the fluid heating device 1 will be described in detail below. Note that in the present specification and drawings, substantially the same components are denoted by the same reference signs, and the repeated description thereof is omitted. Moreover, the embodiment described below is a mere example of various embodiments of the present disclosure. That is, the embodiment to be described below may be readily modified in various manners depending on design without departing from the scope of the present disclosure.

(2-1) Basic Configuration of Fluid Heating Device

First, the basic configuration of the fluid heating device 1 will be described with reference to FIG. 1A. Arrows shown in FIG. 1A indicate directions in which the working fluid 4 flows.

The fluid heating device 1 is a device configured such that the heat accumulator 3 gives, to the working fluid 4 in the pressurizing chamber 2, heat generated from the heat accumulating member 30 by receiving, by the heat accumulator 3, the pressure applied to the working fluid 4.

As illustrated in FIG. 1A, the fluid heating device 1 of the present embodiment includes the pressurizing chamber 2 configured to store the working fluid 4, a pressurizing device 5, a combustion device 6, and a fluid supply device 7. The heat accumulator 3 is disposed in the pressurizing chamber 2. The heat accumulator 3 includes the heat accumulating member 30, and the heat accumulating member 30 releases heat by receiving the pressure applied to the working fluid 4 as described above.

The pressurizing chamber 2 is connected to the pressurizing device 5, the combustion device 6, and the fluid supply device 7 via respective flow paths (e.g., pipes) included in the pressurizing chamber 2. The pressurizing device 5 is, for example, a device configured to apply a pressure to the working fluid 4 to send the working fluid 4 to the pressurizing chamber 2. The fluid supply device 7 is, for example, a device configured to supply the working fluid 4 to the pressurizing device 5. The pressurizing chamber 2 sends the working fluid 4, which is supplied from the pressurizing device 5 to the pressurizing chamber 2, to the combustion device 6. The combustion device 6 is a device configured to generate heat by combusting the working fluid 4 sent from the pressurizing chamber 2.

Note that in FIG. 1A, the fluid heating device 1 includes the combustion device 6 and the fluid supply device 7, but in the fluid heating device 1, the combustion device 6 and the fluid supply device 7 are not essential components. The combustion device 6, the fluid supply device 7, and other components are accordingly set at least in accordance with the structure and the purpose of use of the fluid heating device 1.

Next, components included in the fluid heating device 1 according to the present embodiment will be described in detail.

(2-2) Heat Accumulator

The heat accumulator 3 is a part having a function of accumulating heat in the pressurizing chamber 2 and is disposed in the pressurizing chamber 2. The heat accumulator 3 includes the heat accumulating member 30 configured to release heat by receiving the pressure applied to the working fluid 4. Thus, it can be said that the heat accumulator 3 is a part having the function of accumulating heat and a function of releasing heat in response to the pressure of the working fluid 4. Thus, the heat accumulating member 30 has responsiveness to pressure, and thereby, the heat accumulator 3 can give heat to the working fluid 4 around the heat accumulator 3.

The heat accumulating member 30 included in the heat accumulator 3 may have responsiveness to external stimuli, in particular, responsiveness to pressure. Thus, when the heat accumulating member 30 receives a pressure, the heat accumulating member 30 releases accumulated heat therearound. Thus, the heat accumulator 3 can give heat to members such as the working fluid 4 located around therearound. Thus, when the working fluid 4 in a pressurized state is supplied to the pressurizing chamber 2, the working fluid 4 applies the pressure to the heat accumulator 3, while the heat accumulating member 30 can give heat to the working fluid 4 by receiving a prescribed pressure from the working fluid 4. Note that the responsiveness to external stimuli mentioned herein refers to a property of changing the physical property, structure, and the like of a substance in accordance with an externally given stimulus such as light, a pressure, a current, or the like. The responsiveness to external stimuli includes, for example, responsiveness to pressure, heat responsiveness, electric field responsiveness, optical responsiveness, and the like.

The heat accumulator 3 may include only the heat accumulating member 30 or may include the heat accumulating member 30 and further materials other than the heat accumulating member 30. That is, the heat accumulator 3 may consist of the heat accumulating member 30 or may include: the heat accumulating member 30; and materials other than the heat accumulating member 30. The materials other than the heat accumulating member 30 are not particularly limited as long as the heat accumulator 3 is configured to release heat in response to a pressure.

(2-2-1) Heat Accumulating Member

The heat accumulating member 30 has a function of releasing heat by receiving the pressure applied to the working fluid 4 as described above. The heat accumulating member 30 also preferably absorbs heat from the working fluid 4. In this case, in the fluid heating device 1, the heat accumulating member 30 adsorbs the heat from the working fluid 4, and the heat accumulating member 30 can release heat by receiving the pressure from the working fluid 4. Examples of the pressure by the working fluid 4 include a pressure given from the pressurizing device 5 to the working fluid 4, a pressure existing in the working fluid 4 itself, and a flow pressure caused by a flow of the working fluid 4. Thus, the fluid heating device 1 can repeat accumulating and releasing of heat by using the heat and the pressure of the working fluid 4. Thus, the heat accumulating member 30 can improve the heat transmission to the working fluid 4 and further improve the flowability of the working fluid 4. That is, in the present embodiment, the working fluid 4 can flow while the temperature of the working fluid 4 is suppressed from decreasing and the working fluid 4 is maintained at a high temperature. Therefore, the heat accumulating member 30 can absorb the heat which the working fluid 4 has, and the heat accumulating member 30 can thus accumulate the heat again. Thus, the fluid heating device 1 can be improved in the actuation efficiency and can maintain better operating performance.

A more specific configuration of the heat accumulating member 30 according to the present embodiment will be described.

The heat accumulating member 30 preferably includes a component including a substance which undergoes a phase transition. The phase transition is a phenomenon of changing the internal energy of the system of a substance without a temperature change in the substance. A factor that induces the phase transition is, for example, an externally given external stimulus, that is, an external field, such as heat, a pressure, light, a current, or the like. Thus, the heat accumulating member 30 preferably contains a component including a substance having responsiveness to external stimuli.

In the present embodiment, the heat accumulating member 30 contains a substance that can accumulate heat by the phase transition caused by absorbing heat and can release heat by the phase transition caused by receiving a pressure. In other words, the heat accumulating member 30 of the present embodiment has heat responsiveness and responsiveness to pressure.

The phase transition includes: a phase transition in which a state changes between different phases, for example, from liquid to gas or from gas to liquid (between a gaseous phase and a fluid phase), or from a solid to liquid or from liquid to a solid (between a fluid phase and a solid phase), or from gas to a solid or from a solid to gas (between a gaseous phase to a solid phase); and a phase transition in which a state does not change between the same phases (e.g., between the solid phases). In particular, the heat accumulating member 30 of the present embodiment preferably includes a substance which undergoes the phase transition between the solid phases. The substance which undergoes the phase transition between the solid phases may be an organic compound, an inorganic compound, an alloy, or the like, but in the present embodiment, the heat accumulating member 30 preferably includes at least one kind of component selected from the group consisting of trititanium pentoxide and substitutional trititanium pentoxide. That is, the heat accumulating member 30 may include only trititanium pentoxide, may include only substitutional trititanium pentoxide, or may include both trititanium pentoxide and substitutional trititanium pentoxide. The trititanium pentoxide and the substitutional trititanium pentoxide will be described in detail below.

(As to Trititanium Pentoxide)

The heat accumulating member 30 preferably includes trititanium pentoxide. The trititanium pentoxide is a kind of oxides including titanium, has a composition represented by $Ti_3O_5$, and represents non-substitutional trititanium pentoxide in which Ti atoms in $Ti_3O_5$ are not substituted with atoms other than Ti. The trititanium pentoxide ($Ti_3O_5$) absorbs heat due to the phase transition, and the crystal structure of the trititanium pentoxide ($Ti_3O_5$) thus changes. Types of the crystal structure of the trititanium pentoxide include β-trititanium pentoxide (also referred to as $β-Ti_3O_5$) having a β-type crystal structure, λ-trititanium pentoxide (also referred to as $β-Ti_3O_5$) having a λ-type crystal structure, α-trititanium pentoxide (also referred to as $α-Ti_3O_5$) having an α-type crystal structure, and the like. The $β-Ti_3O_5$ is a non-magnetic semiconductor, and the $λ-Ti_3O_5$ and the $α-Ti_3O_5$ are paramagnetic conductors. When the $β-Ti_3O_5$ is heated, the $β-Ti_3O_5$ undergoes the phase transition to the $λ-Ti_3O_5$. The phase transition in this case is caused at a phase transition temperature of about 190° C. That is, the β-trititanium pentoxide ($βTi_3O_5$) is heated to undergo the phase transition to the λ-trititanium pentoxide ($λ-Ti_3O_5$), thereby absorbing heat. More specifically, in the trititanium pentoxide, when the $βTi_3O_5$ is heated, (i) the $β-Ti_3O_5$ may undergo the phase transition to the $λ-Ti_3O_5$, which may be further heated to undergo the phase transition to the $α-Ti_3O_5$, or (ii) the $β-Ti_3O_5$ may undergo the phase transition directly to the $α-Ti_3O_5$ without the phase transition to the $λ-Ti_3O_5$. In other words, the trititanium pentoxide (i) may have a phase transition temperature at which the $β-Ti_3O_5$ undergoes the phase transition to the $λ-Ti_3O_5$ and a phase transition temperature at which the $λ-Ti_3O_5$ undergoes the phase transition to the $α-Ti_3O_5$, or (ii) may have a phase transition temperature at which the $β-Ti_3O_5$ undergoes the phase transition directly to the $α-Ti_3O_5$.

Thus, when the heat accumulating member 30 includes the trititanium pentoxide, the heat accumulating member 30 radiates and releases heat when, for example, the λ-trititanium pentoxide in a heat accumulation state receives the pressure from the working fluid 4 and undergoes the phase transition to the β-trititanium pentoxide. Thus, the heat accumulating member 30 gives the heat to the working fluid 4. Moreover, when the temperature of the working fluid 4 in a high-pressure state is higher than the phase transition temperature of the β-trititanium pentoxide, the β-trititanium pentoxide absorbs heat of the working fluid 4 and undergoes the phase transition to the λ-trititanium pentoxide. Thus, when the heat accumulating member 30 of the heat accumulator 3 in the fluid heating device 1 includes the trititanium pentoxide, heat can be accumulated or released depending on the pressure and the temperature of the working fluid 4.

Thus, when the heat accumulating member 30 includes the trititanium pentoxide, the fluid heating device 1 can be further improved in the actuation efficiency and can maintain better operating performance.

Note that the trititanium pentoxide is not necessarily limited to include only the $λ-Ti_3O_5$. That is, the trititanium pentoxide may have, for example, a crystal structure of at least one kind of crystal structure selected from the group consisting of the $β-Ti_3O_5$, the $α-Ti_3O_5$, and the $λ-Ti_3O_5$. For example, the heat accumulating member 30 may include trititanium pentoxide containing $β-Ti_3O_5$ which undergoes the phase transition to only $α-Ti_3O_5$. In this case, when the $β-Ti_3O_5$ of the heat accumulating member 30 undergoes the phase transition to the $α-Ti_3O_5$, and the heat accumulating member 30 thus contains the $α-Ti_3O_5$, the trititanium pentoxide may undergo the phase transition to the $β-Ti_3O_5$ again in case of a temperature drop of the heat accumulator 3. Thus, the trititanium pentoxide can release heat accumulated by the $α-Ti_3O_5$. Thus, in the fluid heating device 1, even in a situation where the temperature of the heat accumulator 3 may be lowered, the degree of lowering of the temperature of the working fluid 4 can be moderated. This makes the temperature of the working fluid 4 less likely to decrease, which can contribute to an improvement in work efficiency of the fluid heating device 1, the motor system 10, the movable object 12, and the hydraulic system 100 which will be described later.

(As to Substitutional Trititanium Pentoxide)

The heat accumulating member 30 also preferably include substitutional trititanium pentoxide. The substitutional trititanium pentoxide is distinguished from the trititanium pentoxide (non-substitutional trititanium pentoxide) described above and has a composition in which one or more of Ti atoms of the trititanium pentoxide ($Ti_3O_5$) are substituted with substitutional atoms other than Ti.

The substitutional trititanium pentoxide may have a β-trititanium pentoxide-type crystal structure. In the following description, a phase having the β-trititanium pentoxide-type crystal structure in the substitutional trititanium pentoxide is also referred to as a β-type phase. The β-type phase crystal structure specifically has a structure in which one or more of Ti atoms of β-trititanium pentoxide are substituted with substitutional atoms. The β-type phase is a non-magnetic semiconductor. When the β-type phase is heated, the β-type phase undergoes the phase transition while absorbing heat. That is, the β-type phase has a phase transition temperature. The phase transition temperature of the β-type phase is lower than a phase transition temperature at which a β-trititanium pentoxide type undergoes the phase transition to the λ-trititanium pentoxide. Thus, the substitutional trititanium pentoxide has a phase transition temperature lower than that of the trititanium pentoxide.

In the substitutional trititanium pentoxide, (i) when the β-type phase is heated, the β-type phase may transition to a phase λ-type phase) having a λ-trititanium pentoxide-type crystal structure, which is further heated to transition to a phase (α-type phase) having an α-trititanium pentoxide-type crystal structure, or (ii) when the β-type phase is heated, the β-type phase may transition to a phase (α-type phase) having an α-trititanium pentoxide-type crystal structure. In other words, the substitutional trititanium pentoxide (i) may have a phase transition temperature at which the β-type phase transitions to the λ-type phase and a phase transition temperature at which the λ-type phase transitions to the α-type phase or (ii) may have a phase transition temperature at which the β-type phase transitions directly to the α-type phase. Each of the phase transition temperatures of the substitutional trititanium pentoxide is lower than that of the phase transition temperature of the trititanium pentoxide. Note that the λ-type phase crystal structure specifically has a structure in which one or more of Ti atoms of the λ-trititanium pentoxide are substituted with substitutional atoms. The α-type phase crystal structure specifically has a structure in which one or more of Ti atoms of the α-trititanium pentoxide are substituted with substitutional atoms. Each of the λ-type phase and the α-type phase is a paramagnetic conductor. Note that in the present specification, for convenience of explanation, a β1-type phase means the β-type phase in the case where the β-type phase transitions to the λ-type phase, and a β2-type phase means the β-type phase in the case of having a phase transition temperature at which the β-type phase does not transition to the λ-type phase but transitions directly to the α-type phase and a phase transition temperature at which the α-type phase transitions directly to the β-type phase.

In the substitutional trititanium pentoxide, the substitutional atom is preferably at least one kind of atom selected from the group consisting of Hf, Zr, Si, Sc, and Y.

The substitutional trititanium pentoxide has a property of absorbing heat when the substitutional trititanium pentoxide undergoes the phase transition by being heated. The endothermic amount of the substitutional trititanium pentoxide is adjustable by adjusting the kind and the proportion of the substitutional atom. Note that the crystal structure of the substitutional trititanium pentoxide can be checked by, for example, an X-ray Diffraction (XRD). Thermal properties such as the phase transition temperature and the endothermic amount of the substitutional trititanium pentoxide can be checked by, for example, Differential scanning calorimetry (DSC). Note that the phase transition temperatures of substitutional trititanium pentoxides including the above-mentioned substitutional atoms differ depending on the substitution proportion of the substitutional atoms but are all lower than the phase transition temperature (about 190° C.) of the trititanium pentoxide. When the substitutional trititanium pentoxide undergoes the phase transition, the substitutional trititanium pentoxide discontinuously changes its physical property as its crystal structure changes.

In the substitutional trititanium pentoxide, the amount of the substitutional atoms with respect to the total amount of Ti and the substitutional atoms is preferably higher than or equal to 1 atom % (at %). In this case, the substitutional trititanium pentoxide may have a further lowered phase transition temperature.

The substitutional atoms preferably include at least one of Hf or Sc. Hf and Sc can particularly lower the phase transition temperature of the substitutional trititanium pentoxide. It is also preferable that the substitutional atoms include only Hf. It is also preferable that the substitutional atoms include only Sc. It is also preferable that the substitutional atoms include only Hf and Sc. The total amount of Hf and Sc with respect to the total amount of Ti and the substitutional atoms in the substitutional trititanium pentoxide is preferably higher than or equal to 1 at %. That is, the substitutional atom preferably includes Hf, and the amount of Hf with respect to the total amount of Ti and the substitutional atoms is preferably higher than or equal to 1 at %. It is also preferable that the substitutional atoms include Sc and the amount of Sc with respect to the total amount of Ti and the substitutional atoms is higher than or equal to 1 at %. It is also preferable that the substitutional atoms include both Hf and Sc and the total amount of Hf and Sc with respect to the total amount of Ti and the substitutional atoms is higher than or equal to 1 at %. In this case, the substitutional trititanium pentoxide may have a particularly low phase transition temperature.

The total amount of Hf and Sc with respect to the total amount of Ti and the substitutional atoms in the substitutional trititanium pentoxide is more preferably higher than or equal to 3 at %. That is, it is more preferable that the substitutional atoms include Hf and the amount of Hf with respect to the total amount of Ti and the substitutional atoms is higher than or equal to 3 at %. It is also more preferable that the substitutional atoms include Sc and the amount of Sc with respect to the total amount of Ti and the substitutional atoms is higher than or equal to 3 at %. It is also more preferable that the substitutional atoms include both Hf and Sc and the total amount of Hf and Sc with respect to the total amount of Ti and the substitutional atoms is higher than or equal to 3 at %. In these cases, it is achievable that the substitutional trititanium pentoxide has a phase transition temperature of lower than or equal to 100° C. When the phase transition temperature is lower than or equal to 100°

C., for example, water heated to about the boiling point can be used to cause the substitutional trititanium pentoxide to absorb heat.

It is further preferable that the substitutional atoms are only Hf and the amount of Hf with respect to Ti and the substitutional atoms in the substitutional trititanium pentoxide is higher than or equal to 3 at %. It is also further preferable that the substitutional atoms are only Sc and the amount of Sc with respect to Ti and the substitutional atoms in the substitutional trititanium pentoxide is higher than or equal to 3 at %.

The amount of the substitutional atom with respect to the total amount of Ti and the substitutional atoms in the substitutional trititanium pentoxide is preferably lower than or equal to 10 at %. In this case, the phase transition temperature of the substitutional trititanium pentoxide can be further lowered, and an excellent endothermic nature of the substitutional trititanium pentoxide can be maintained as compared to the trititanium pentoxide.

Two or more kinds of substitutional atoms may be used. That is, the substitutional trititanium pentoxide may have a composition obtained by substituting one or more Ti atoms in the trititanium pentoxide with two or more kinds of substitutional atoms selected from Hf, Zr, Sc, Y, and Si. Also in this case, the substitutional trititanium pentoxide can have a lower phase transition temperature than the trititanium pentoxide and can have an excellent endothermic nature.

(As to β1-Type Phase β-Substitutional Trititanium Pentoxide)

The β-type substitutional trititanium pentoxide can have a phase transition temperature at which the β-type phase β1-type phase) transitions to the λ-type phase. That is, the substitutional trititanium pentoxide can have at least one of the β1-type phase or the λ-type phase. When the substitutional trititanium pentoxide is heated, the β1-type phase absorbs heat and then transitions to the λ-type phase. On the other hand, after the β1-type phase transitions to the λ-type phase, simply cooling the substitutional trititanium pentoxide does not change the crystal structure of the λ-type phase, and the λ-type phase is thus maintained. Moreover, after the β1-type phase transitions to the λ-type phase, further heating the substitutional trititanium pentoxide can cause the phase transition to the α-type phase. Then, when the substitutional trititanium pentoxide which has undergone the phase transition to the α-type phase is cooled, the substitutional trititanium pentoxide can undergo the phase transition to the λ-type phase. In this case, the substitutional trititanium pentoxide having the λ-type phase crystal structure does not undergo phase transition to the β1-type phase even when the substitutional trititanium pentoxide is further cooled, and the λ-type phase is maintained in a heat accumulated state.

The substitutional trititanium pentoxide having the β1-type phase also further has responsiveness to external stimuli other than the heat responsiveness. For example, after the substitutional trititanium pentoxide is heated and the β1-type phase transitions to the λ-type phase, the substitutional trititanium pentoxide is pressurized, and thereby, the λ-type phase can transition to the β1-type phase. The β1-type phase thus generated is maintained in the β1-type phase also after the pressurization is released. A pressure required to cause the λ-type phase to transition to the β1-type phase depends on the composition of the substitutional trititanium pentoxide but is, for example, greater than or equal to 1 MPa and lower than or equal to 3 GPa. When the external stimulus is light, the light is preferably pulse light. The pulse light is, for example, a Nd:YAG laser beam.

The substitutional trititanium pentoxide having the β1-type phase is obtained by, for example, heating a mixture obtained by mixing titanium oxide and a component containing at least one kind of atom selected from the group consisting of Hf, Zr, Si, Sc, and Y under a hydrogen atmosphere. Thus, the substitutional trititanium pentoxide having the β1-type phase is obtained.

A production method of the substitutional trititanium pentoxide having the β1-type phase will be described in detail.

First, titanium oxide and a component containing at least one kind of atom selected from the group consisting of Hf, Zr, Si, Sc, and Y (hereinafter also referred to as a substitutional atom component) are prepared. The titanium oxide is preferably titanium dioxide. The crystal structure of the titanium dioxide is not particularly limited, but the titanium dioxide may be of a rutile-type, an anatase-type, or a brookite-type. The substitutional atom component may be an elemental substance or a compound. Examples of the substitutional atom component include hafnium oxide(IV) ($HfO_2$), hafnium silicate(IV) ($HfSiO_4$), oxidation zirconium (IV) ($ZrO_2$), scandium oxide(III) ($Sc_2O_3$), scandium nitrate ($Sc(NO_3)_3$), oxidation yttrium (III) ($Y_2O_3$), yttrium nitride (YN), silicon dioxide ($SiO_2$), and silicon nitride ($Si_3N_4$). The amounts of the titanium dioxide and the substitutional atom component are adjusted in accordance with the ratio of the titanium atoms to the substitutional atoms in the substitutional trititanium pentoxide.

Next, for example, a mixture is prepared by mixing powder of the titanium dioxide and powder of the substitutional atom component. The mixture is preferably, for example, in pellet form. The mixture is put in a baking furnace such as an electric furnace and is heated under a high-temperature hydrogen gas atmosphere, thereby obtaining substitutional trititanium pentoxide. More specifically, for example, the mixture is heated in a baking furnace filled with a hydrogen gas or a mixed gas of an inert gas and the hydrogen gas. The inert gas is, for example, a nitrogen gas. The temperature in the baking furnace when heating is performed is, for example, higher than or equal to 1200° C. and lower than or equal to 1600° C., and the heating time is, for example, longer than or equal to 1 hour and shorter than or equal to 24 hours. The production method enables the substitutional trititanium pentoxide having the β1-type phase to be manufactured. That the substitutional trititanium pentoxide has the β1-type phase can be confirmed by comparing an X-ray diffraction pattern of the substitutional trititanium pentoxide to an X-ray diffraction pattern of the trititanium pentoxide. The substitutional trititanium pentoxide may also have the λ-type phase, but giving an external stimulus, such as a mechanical pressure, to the substitutional trititanium pentoxide by a hydraulic press and the like enables the λ-type phase to transition to the β1-type phase.

In the production method, for example, when the substitutional atoms are Hf, substitutional trititanium pentoxide is obtained in which the amount of the substitutional atoms with respect to the total amount of Ti and the substitutional atoms (hereinafter also referred to as a substitution proportion) in the substitutional trititanium pentoxide is greater than 0 at % and less than 10 at %. When the substitutional atoms are Zr, substitutional trititanium pentoxide having a substitution proportion greater than 0 at % and less than or equal to 3 at % is obtained. When the substitutional atoms are Si, substitutional trititanium pentoxide having a substitution proportion greater than 0 at % and less than or equal to 3 at % is obtained. When the substitutional atoms are Sc, substitutional trititanium pentoxide having a substitution proportion greater than 0 at % and less than 3 at % is obtained. When the substitutional atoms are Y, substitutional trititanium pentoxide having a substitution proportion greater than 0 at % and less than or equal to 3 at % is obtained. Moreover, in the production method, when the substitutional atoms are Hf and Zr, substitutional trititanium pentoxide is obtained in which the proportion of each of Hf and Zr with respect to the total amount of the Ti and the substitutional atoms is greater than 0 at % and less than or equal to 3 at %. When the substitutional atoms are Hf and Si, substitutional trititanium pentoxide is obtained in which the proportion of each of Hf and Si with respect to the total amount of the Ti and the substitutional atoms is greater than 0 at % and less than or equal to 3 at %. When the substitutional atoms are Sc and Y, substitutional trititanium pentoxide is obtained in which the proportion of each of Sc and Y with respect to the total amount of the Ti and the substitutional atoms is greater than 0 at % and less than or equal to 1.5 at %. Note that the substitutional atoms, the combination of the substitutional atoms, and the setting of the substitution proportion are not limited to these examples but may accordingly be adjusted in accordance with the composition of substitutional trititanium pentoxide to be obtained.

Moreover, the substitutional trititanium pentoxide having the β1-type phase can be produced by, other than the above-described method, exposing, to an arc discharge under an inert gas atmosphere, a mixture obtained by mixing titanium oxide and a component containing at least one kind of atom selected from the group consisting of Hf, Zr, Si, Sc, and Y. In this case, substitutional trititanium pentoxide having the β1-type phase and the λ-type phase is obtained. That the substitutional trititanium pentoxide has the β1-type phase and the λ-type phase can be confirmed by comparing an X-ray diffraction pattern of the substitutional trititanium pentoxide to an X-ray diffraction pattern of the trititanium pentoxide. In the production method, further blending metal titanium into the mixture including the titanium oxide and the substitutional atom component is also preferable. When the mixture includes the metal titanium, the arc discharge which will be described later is easily generated.

Specifically, for example, titanium dioxide, a substitutional atom component, and metal titanium are prepared at first. The titanium dioxide and the substitutional atom component may be the same as the components described above. The amount of each of the metal titanium, the titanium dioxide, and the substitutional atom component can be adjusted in accordance with the ratio of the titanium atoms to the substitutional atoms in the substitutional trititanium pentoxide. For example, powder of the titanium dioxide, powder of the substitutional atom component, and powder of the metal titanium are mixed, thereby preparing a mixture. The mixture is preferably, for example, in pellet form. The mixture is put in, for example, an arc furnace (e.g., arc sintering furnace) and is melted by being exposed to an arc discharge under an inert gas atmosphere. The inert gas is, for example, an argon gas. Subsequently, the mixture exposed to the arc discharge is rapidly cooled by water cooling or the like, thereby obtaining the substitutional trititanium pentoxide having the λ-type phase and the β1-type phase.

In the production method, for example, when the substitutional atoms are Hf, substitutional trititanium pentoxide having a substitution proportion greater than or equal to 10 at % is obtained. When the substitutional atoms are Sc, substitutional trititanium pentoxide having a substitution proportion greater than or equal to 3 at % is obtained. Note that these substitutional atoms and substitution proportions are shown as mere examples and are not limited to these examples.

(As to β2-Type Phase β-Substitutional Trititanium Pentoxide)

The β-type substitutional trititanium pentoxide can have a phase transition temperature at which the β-type phase (the β2-type phase) transitions to the α-type phase as described above. That is, the substitutional trititanium pentoxide according to the present embodiment has at least one of the β2-type phase or the α-type phase.

When the substitutional trititanium pentoxide is heated, the β2-type phase absorbs heat and thus transitions to the α-type phase. Moreover, when the substitutional trititanium pentoxide is cooled after the β2-type phase transitions to the α-type phase, the α-type phase releases heat to transition to the β2-type phase. That is, the substitutional trititanium pentoxide according to the present embodiment has not only the phase transition temperature at which the β2-type phase transitions to the α-type phase but also a phase transition temperature at which the α-type phase transitions to the β2-type phase.

The substitutional trititanium pentoxide having the β2-type phase preferably has a composition obtained by substituting one or more of Ti atoms of the trititanium pentoxide ($Ti_3O_5$) with substitutional atoms including at least one kind of atom selected from the group consisting of Hf, Zr, Sc, and Y. In this case, the substitutional trititanium pentoxide has a low phase transition temperature and can have an excellent heat absorbing and releasing property.

A production method of the substitutional trititanium pentoxide having the β2-type phase will be described.

The substitutional trititanium pentoxide according to the present embodiment can be obtained by exposing, to an arc discharge under an inert gas atmosphere, a mixture obtained by mixing titanium oxide and a component containing at least one kind of atom selected from the group consisting of Hf, Zr, Si, Sc, and Y. In this case, substitutional trititanium pentoxide having the β2-type phase is obtained. That the substitutional trititanium pentoxide has the β2-type phase can be confirmed by comparing an X-ray diffraction pattern of the substitutional trititanium pentoxide to an X-ray diffraction pattern of the trititanium pentoxide.

To produce the substitutional trititanium pentoxide, further blending metal titanium into the mixture including the titanium oxide and the substitutional atom component is also preferable. When the mixture includes the metal titanium, the arc discharge is easily generated due to an improvement in electrical conductivity of the mixture. Thus, the production efficiency of the substitutional trititanium pentoxide having the β2-type phase can be improved. Moreover, in this case, the structure of the substitutional trititanium pentoxide having the β2-type phase having a composition as a target is easily obtained by accordingly adjusting the blending amount of the metal titanium and the titanium dioxide.

The substitutional trititanium pentoxide having the β2-type phase can be produced, for example, as described below. First, titanium dioxide, a substitutional atom component, and metal titanium are prepared. The titanium dioxide and the substitutional atom component may be the same as the components descried in "As to β1-Type Phase β-Substitutional Trititanium Pentoxide". The amount of each of the metal titanium, the titanium dioxide, and the substitutional atom component can be adjusted in accordance with the ratio of the titanium atoms to the substitutional atoms in the substitutional trititanium pentoxide. Next, for example, powder of the titanium dioxide, powder of the substitutional atom component, and powder of the metal titanium are mixed, thereby preparing a mixture. The mixture is preferably, for example, in pellet form. The mixture is put in, for example, an arc furnace (e.g., arc sintering furnace) and is melted by being exposed to an arc discharge under an inert gas atmosphere. The inert gas is, for example, an argon gas. Subsequently, the mixture exposed to the arc discharge is rapidly cooled by water cooling or the like, thereby obtaining the substitutional trititanium pentoxide having the β2-type phase.

In the production method, for example, when the substitutional atoms are Hf, substitutional trititanium pentoxide having a substitution proportion greater than 0 at % and less than 3 at % is obtained. When the substitutional atoms are Zr, substitutional trititanium pentoxide having a substitution proportion greater than 0 and less than or equal to 3 at % is obtained. When the substitutional atoms are Si, substitutional trititanium pentoxide having a substitution proportion greater than 0 and less than or equal to 3 at % is obtained. When the substitutional atoms are Sc, substitutional trititanium pentoxide having a substitution proportion greater than 0 and less than 3 at % is obtained. When the substitutional atoms are Y, substitutional trititanium pentoxide having a substitution proportion greater than 0 and less than or equal to 3 at % is obtained. Moreover, when the substitutional atoms are Hf and Zr, substitutional trititanium pentoxide is obtained in which the proportion of each of Hf and Zr with respect to the total amount of the Ti and the substitutional atoms is greater than 0 at % and less than or equal to 1.5 at %. When the substitutional atoms are Hf and Si, substitutional trititanium pentoxide is obtained in which the proportion of each of Hf and Si with respect to the total amount of the Ti and the substitutional atoms is greater than 0 at % and less than or equal to 1.5 at %. When the substitutional atoms are Sc and Y, substitutional trititanium pentoxide is obtained in which the proportion of each of Sc and Y with respect to the total amount of the Ti and the substitutional atoms is greater than 0 at % and less than or equal to 1.5 at %. Note that the substitutional atoms, the combination of the substitutional atoms, and the setting of the substitution proportion are not limited to these examples but may accordingly be adjusted in accordance with the composition of substitutional trititanium pentoxide to be obtained.

(β-Substitutional Trititanium Pentoxide having β1-Type Phase and 2-Type Phase)

The substitutional trititanium pentoxide has a phase transition temperature T1 at which the β-type phase (β1-type phase) transitions to the λ-type phase and a phase transition temperature T2 at which the β-type phase (the β2-type phase) transitions to the α-type phase. Since the β2-type phase and the α-type phase reversibly undergo the phase transition in response to heat, the substitutional trititanium pentoxide according to the present embodiment further has a phase transition temperature T3 at which the α-type phase transitions to the β-type phase (the β2-type phase). That is, the substitutional trititanium pentoxide according to the present embodiment has at least one of the β1-type phase or the λ-type phase, and at least one of the β2-type phase or the α-type phase.

The three kinds of phase transition temperatures T1, T2, and T3 in the substitutional trititanium pentoxide having the β1-type phase and the β2-type phase satisfy, for example, the relationship T3<T1<T2. In this case, when the substitutional trititanium pentoxide is heated, the β1-type phase transitions to the λ-type phase at the phase transition temperature T1 at first, and when the substitutional trititanium pentoxide is further heated, the β2-type phase transitions to the α-type phase at the phase transition temperature T2. Subsequently, when the substitutional trititanium pentoxide is cooled, the α-type phase transitions to the β2 phase at the phase transition temperature T3, but the λ-type phase does not undergo the phase transition and is maintained. That the λ-type phase is present in the substitutional trititanium pentoxide after the cooling as in this case means that when the substitutional trititanium pentoxide is heated, and the temperature thereof sequentially exceeds the phase transition temperatures T1 and T2, the thermal history thereof is memorized in the substitutional trititanium pentoxide also after the cooling.

As described above, when the heat accumulating member 30 includes the substitutional trititanium pentoxide, the heat transmission to the working fluid 4 is easily improved, and heat loss is reduced. Thus, the heat accumulating member 30 contributes to a particular improvement in the flowability of the working fluid 4. In particular, the substitutional trititanium pentoxide can undergo the phase transition at a temperature lower than about 190° C. as described above, and therefore, when the heat accumulating member 30 includes the substitutional trititanium pentoxide, the heat accumulator 3 can accumulate heat even when the fluid heating device 1 has a low temperature. Thus, the fluid heating device 1 can be operated even at a relatively low temperature. That is, in this case, the heat accumulator 3 can easily repeat releasing heat to and absorbing heat from the working fluid 4 which is in a pressurized state, and therefore, satisfactory flowability of the working fluid 4 can be maintained. Thus, the operating performance of the fluid heating device 1 can be maintained in a good state.

Note that the substitutional trititanium pentoxide may have a crystal structure of at least one kind of crystal structure selected from the group consisting of the β-type phase, the α-type phase, and the λ-type phase. Thus, for example, in the case of the heat accumulating member 30 including the substitutional trititanium pentoxide having the β2-type phase, when the β2-type phase transitions to the α-type phase and the heat accumulating member 30 thus has the α-type phase, the substitutional trititanium pentoxide can undergo the past transition to the β2-type phase again in a temperature drop of the heat accumulator 3. Thus, the substitutional trititanium pentoxide can release heat accumulated in the α-type phase. Thus, even when the fluid heating device 1 is in a situation where the temperature of the heat accumulator 3 may be lowered, the degree of lowering of the temperature of the working fluid 4 can be moderated. This makes the temperature of the working fluid 4 less likely to decrease, which can contribute to an improvement in work efficiency of the fluid heating device 1, the motor system 10, the movable object 12, and the hydraulic system 100 which will be described later.

(2-2-2) Shapes of Heat Accumulator and Heat Accumulating Member

Shapes and the like of the heat accumulator 3 and the heat accumulating member 30 according to the present embodiment will be described below.

Figure 2A:
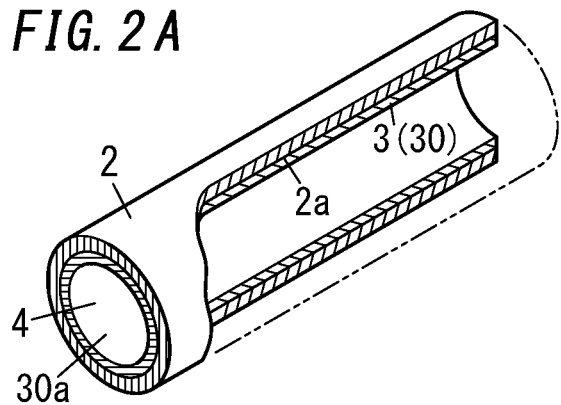
FIG. 2A is a sectional view schematically illustrating a pressurizing chamber including a heat accumulator of the fluid heating device according to the embodiment.

FIG. 2A is a sectional view schematically illustrating the pressurizing chamber 2 including the heat accumulator 3 including the heat accumulating member 30. The heat accumulator 3 is formed on an inner peripheral surface 2a of a hollow member forming the pressurizing chamber 2 described later. The heat accumulator 3, that is, the heat accumulating member 30 is provided on at least part of the inner peripheral surface 2a of the hollow member including the pressurizing chamber 2, and, for example, the heat accumulator 3 may be provided on the entire surface of the inner peripheral surface 2a of the hollow member including the pressurizing chamber 2. In FIG. 2A, the heat accumulator 3 is formed such that the heat accumulating member 30 entirely covers the inner peripheral surface 2a of the hollow member including the pressurizing chamber 2, and the heat accumulator 3 has a tubular shape having a hollow part 30a. The working fluid 4 flows through the hollow part 30a. In this case, the heat accumulator 3 in the pressurizing chamber 2 easily receives the pressure from the working fluid 4, and the pressurizing chamber 2 can improve the heat transmission to the working fluid 4.

Figure 2D:
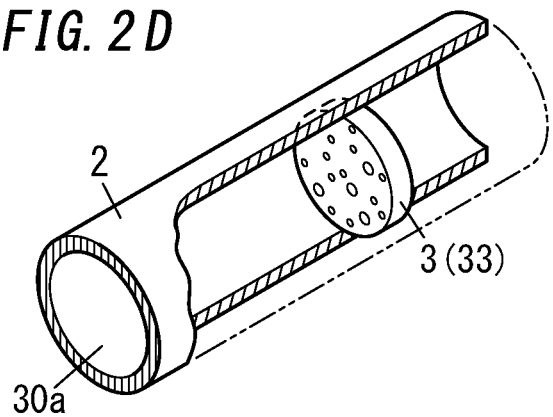
FIG. 2D is a sectional view schematically illustrating a pressurizing chamber including yet another heat accumulator of the fluid heating device according to the embodiment.
Figure 2B:
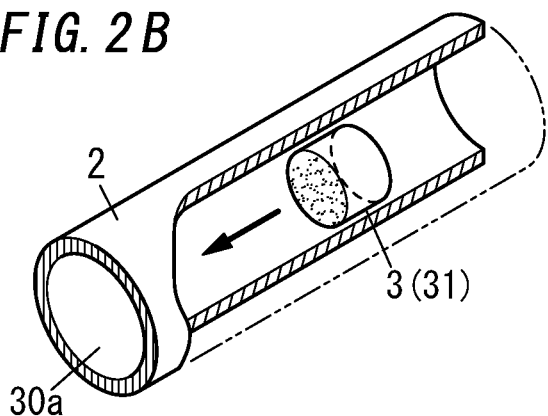
FIG. 2B is a sectional view schematically illustrating a pressurizing chamber including another heat accumulator of the fluid heating device according to the embodiment.

FIG. 2B is a schematic sectional view of a pressurizing chamber 2 including a heat accumulator 3 including a heat accumulating member 31 in place of the heat accumulating member 30 shown in FIG. 2A. In FIG. 2B, components the same as those of the pressurizing chamber 2 shown in FIG. 2A are denoted by the same reference signs. The heat accumulating member 31 is in bulk form. That is, the heat accumulator 3 may include the heat accumulating member 31 in bulk form. Also in this case, the pressurizing chamber 2 can be caused to easily receive the pressure from the working fluid 4 and can improve the heat transmission to the working fluid 4. The heat accumulating member 31 in bulk form has a length and an outer diameter. Here, saying that the heat accumulating member 31 is in "bulk form" means that the heat accumulating member 31 in bulk form is distinguished from a heat accumulating member 32 in granular form described later. The heat accumulating member 31 in bulk form has a dimension which is defined by, for example, the length and the outer diameter of the heat accumulating member 31 in bulk form and which can be smaller than or substantially the same as the inner diameter of the pressurizing chamber 2. When the outer diameter or length of the heat accumulating member 31 in bulk form is smaller than the inner diameter of the pressurizing chamber 2, the heat accumulating member 31 in bulk form can move in the pressurizing chamber 2 along with the flow of the working fluid 4 as indicated by the arrow in FIG. 2B. Thus, the heat accumulating member 31 in bulk form is more easily receive the pressure from the working fluid 4 and can be improved in its heat releasing efficiency. In FIG. 2B, the heat accumulating member 31 in bulk form has a solid cylindrical shape but is not limited to this example. For example, the heat accumulating member 31 in bulk form may have a solid spherical or polygonal shape.

Figure 2E:
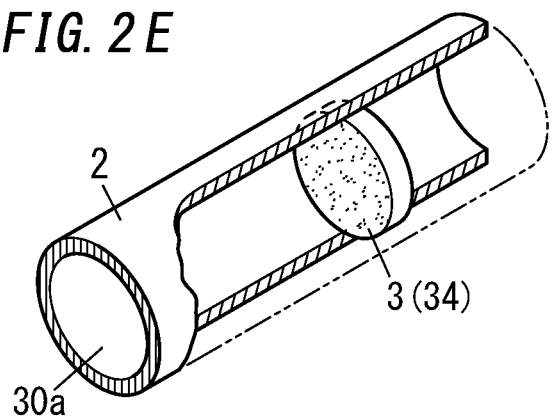
FIG. 2E is a sectional view schematically illustrating a pressurizing chamber including further heat accumulator of the fluid heating device according to the embodiment.
Figure 2C:
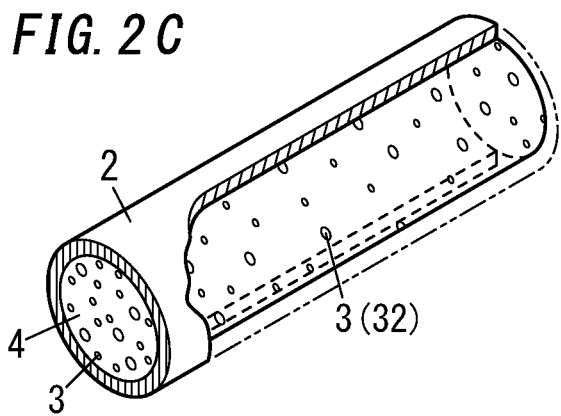
FIG. 2C is a sectional view schematically illustrating a pressurizing chamber including still another heat accumulator of the fluid heating device according to the embodiment.

FIG. 2C is a schematic sectional view of a pressurizing chamber 2 including a heat accumulator 3 including the heat accumulating member 32 in place of the heat accumulating member 30 shown in FIG. 2A. In FIG. 2C, components the same as those of the pressurizing chamber 2 shown in FIG. 2A are denoted by the same reference signs. The heat accumulator 3 includes a plurality of heat accumulating members 32 in granular form. In this case, the heat accumulator 3 includes the plurality of heat accumulating members 32 in granular form, thereby increasing the area of the heat accumulator 3 in which the heat accumulating members 32 can come into contact with the working fluid 4. This causes the heat accumulator 3 to more easily receive the pressure from the working fluid 4. Thus, the heat transmission to the working fluid 4 can be further improved. Here, saying that the heat accumulating member 32 is in "granular form" means that the heat accumulating member includes a plurality of heat accumulating members 32 and the relative positional relationship of these plurality of heat accumulating members accordingly changes. The smallest particle size of the plurality of heat accumulating members 32 in granular form is, for example, at least larger than the diameter of a supply port and a discharge port of the common rail 20. The smallest particle size of the heat accumulating members 32 in granular form is, for example, larger than or equal to 600 μm. Note that the smallest particle size of the heat accumulating members 32 in granular form is obtained from particle size distribution measured by a laser diffraction and scattering method. Moreover, the heat accumulating members 32 in granular form may have a void through which the working fluid 4 is allowed to pass. A plurality of voids may be porously provided as in the case of a heat accumulating member 34 in porous form as described later. Note that the dimension of the void in the heat accumulating members 32 in granular form is not particularly limited.

FIG. 2D is a schematic sectional view of a pressurizing chamber 2 including a heat accumulator 3 including a heat accumulating member 33 in place of the heat accumulating member 30 shown in FIG. 2A. In FIG. 2D, components the same as those of the pressurizing chamber 2 shown in FIG. 2A are denoted by the same reference signs. The heat accumulator 3 includes a heat accumulating member 33 in mesh form. Also in this case, the area in which the heat accumulator 3 comes into contact with the working fluid 4 increases, and therefore, the heat accumulator 3 is caused to more easily receive the pressure from the working fluid 4. Thus, the heat transmission to the working fluid 4 can be improved. The heat accumulating member 33 in mesh form may be disposed such that holes thereof extend, for example, along a direction in which the working fluid 4 flows as illustrated in FIG. 2D. Note that in FIG. 2D, an outer peripheral surface of the heat accumulating member 33 in mesh form is disposed and fixed along an inner peripheral surface of the pressurizing chamber 2, but the heat accumulating member 33 in mesh form may be movably disposed in the pressurizing chamber 2. Moreover, the dimension, the dimension of the heat accumulating member 33 in mesh form and the number of holes of the heat accumulating member 33 in mesh form are not particularly limited but may accordingly be determined so as to allow the working fluid 4 to flow therethrough.

FIG. 2E is a schematic sectional view of a pressurizing chamber 2 including a heat accumulator 3 including the heat accumulating member 34 in place of the heat accumulating member 30 shown in FIG. 2A. In FIG. 2E, components the same as those of the pressurizing chamber 2 shown in FIG. 2A are denoted by the same reference signs. The heat accumulator 3 includes the heat accumulating member 34 in porous form. The area in which the heat accumulator 3 comes into contact with the working fluid 4 increases, and therefore, the heat accumulator 3 is caused to more easily receive the pressure from the working fluid 4. Thus, the heat transmission to the working fluid 4 can be improved.

Figure 2F:
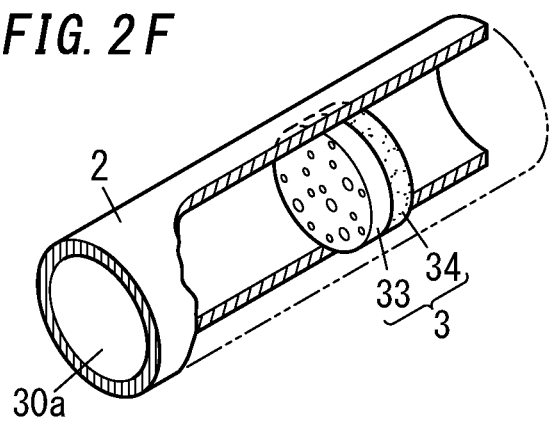
FIG. 2F is a sectional view schematically illustrating a pressurizing chamber including still further heat accumulator of the fluid heating device according to the embodiment.

Examples in each of which the heat accumulating member 30 is used alone have been described above, but the shape of the heat accumulator 3 and the shape of the heat accumulating member 30 included in the heat accumulator 3 are not limited to these examples. For example, the various shapes of the heat accumulating members 30 described above may be combined to form the heat accumulator 3 from a plurality of heat accumulating members 30 having different shapes. For example, FIG. 2F is a schematic sectional view of a pressurizing chamber 2 including the heat accumulator 3 including heat accumulating members 33 and 34 in place of the heat accumulating member 30 shown in FIG. 2A. In FIG. 2F, components the same as those of the pressurizing chamber 2 shown in FIG. 2A are denoted by the same reference signs. As illustrated in FIG. FIG. 2F, the heat accumulating member 33 in mesh form and the heat accumulating member 34 in porous form may be combined with each other to form the heat accumulator 3. Alternatively, when the heat accumulator 3 is formed from a plurality of heat accumulating members 30 having different shapes, the heat accumulating members 30 do not have to be in contact with each other unlike the example shown in FIG. 2F, and the heat accumulating members 30 may be disposed at locations apart from each other to form the heat accumulator 3. Moreover, in the pressurizing chamber 2, the common rail 20 and a flow path 21 which will be described later may have heat accumulators 3 formed from heat accumulating members 30 having the same shape or heat accumulators 3 formed from heat accumulating members 30 having different shapes. In other words, respective heat accumulators 3 formed from different heat accumulating members 30 may be disposed in the common rail 20 and the flow path 21.

Note that in FIGS. 2D to 2F, the pressurizing chamber 2 is formed in the shape of a cylinder, and the heat accumulator 3 has a columnar shape having a circumference along the inner peripheral surface 2a of the cylinder of the pressurizing chamber 2, but this should not be construed as limiting, and the pressurizing chamber 2 may be configured to allow the working fluid 4 to flow within the pressurizing chamber 2. That is, the heat accumulator 3 is at least configured to receive the pressure from the working fluid 4.

(2-3) Pressurizing Chamber

The pressurizing chamber 2 is a part configured to store the working fluid 4, and in the pressurizing chamber 2, the heat accumulator 3 is disposed. The pressurizing chamber 2 is formed, for example, in a hollow member having a hollow. In this case, the hollow member includes the pressurizing chamber 2. Moreover, in this case, the heat accumulator 3 is formed on the inner peripheral surface 2a of the hollow member. The inner peripheral surface 2a of the hollow member is, for example, a surface where the common rail 20 described later and the working fluid 4 comes into contact with each other, and in the flow path 21, the inner peripheral surface 2a is a surface where the flow path 21 and the working fluid 4 comes into contact with each other.

In the present embodiment, the pressurizing chamber 2 includes the common rail 20 and one or more flow paths 21. The common rail 20 has, for example, a cylindrical shape having a length, has a hollow therein, and has one or more supply ports and one or more discharge ports. In FIG. 1A, the common rail 20 has one supply port 20a and a plurality of discharge ports 20b to 20e. The hollow in the common rail 20 is a space within which the working fluid 4 can flow, and the space can store the working fluid 4 which is highly pressurized and which is in a pressurized state until the working fluid 4 is discharged through the discharge ports 20b to 20e. That is, it can be said that the common rail 20 is a device that stores a high-pressure fluid such as the working fluid 4. Into the common rail 20, the working fluid 4 is supplied through the supply port 20a, and the common rail 20 discharges the working fluid 4 through the discharge ports 20b to 20e and supplies the working fluid 4 to the combustion device 6.

The material, the shape, the structure, and the like of the common rail 20 are not particularly limited. Since the common rail 20 enters a high-pressure state, the common rail 20 is preferably formed from a high-pressure resistant material. The dimension of the common rail 20 is also not particularly limited and may accordingly be set in accordance with an application.

The flow path 21 has, for example, a length and has a tubular shape. For example, the flow path 21 includes a supply flow path 21a, a supply flow path 21c, a discharge flow path 21b, and a discharge flow path 21d. The flow path 21 may further include a flow path (e.g., a further supply flow path, a further discharge flow path) having a similar function to the above-described flow paths but being other than the above-described flow paths. For example, one end of a flow path 21e other than the flow paths 21a to 12d in FIG. 1A is connected to the common rail 20, and the other end of the flow path 21e is connected to the fluid supply device 7. The flow path 21e is, for example, a flow path configured to collect the working fluid 4 which may leak from the common rail 20. In the following description, a simple term "flow path" in (2-3) refers to the supply flow path and the discharge flow path in common without distinguishing them from each other.

In FIG. 1A, the common rail 20 is connected to one end of the supply flow path 21a via the supply port 20a. The other end of the supply flow path 21a is connected to the pressurizing device 5. In other words, the common rail 20 and the pressurizing device 5 are connected to each other via the supply flow path 21a. The common rail 20 is connected to one end of the discharge flow path 21b via one discharge port, for example, the discharge port 20b, of the plurality of discharge ports 20b to 20e. The other end of the discharge flow path 21b is connected to the combustion device 6. In other words, the common rail 20 and the combustion device 6 are connected to each other via the discharge flow path 21b. Moreover, the supply flow path 21c connects the pressurizing device 5 to the fluid supply device 7. The supply flow path 21c is a flow path through which the working fluid 4 stored in the fluid supply device 7 is sent to the pressurizing device 5. The discharge flow path 21d connects the combustion device 6 to the pressurizing device 5 and connects the combustion device 6 to the fluid supply device 7. The discharge flow path 21d is, for example, a flow path that collects the working fluid 4 that leaks from the combustion device 6. Note that the pattern of connection of the flow paths 21 (21a, 21b, 21c, 21d) of the pressurizing chamber 2 to the respective devices is not limited to these examples, but the flow paths 21 are at least connected to the respective devices so as to be able to execute operation as described below.

The heat accumulator 3 is disposed in at least one of the common rail 20 or the flow path 21. In the present embodiment, the heat accumulator 3 is disposed in at least the common rail 20. When the heat accumulator 3 is disposed in the common rail 20, the working fluid 4 can be more efficiently heated, and the working fluid 4 can be discharged at a high temperature and in a high-pressure state. That is, the heat transmission to the working fluid 4 can be further improved, and the fluid heating device 1 can be operated while the high flowability of the working fluid 4 is maintained. Moreover, when a heat accumulator 3 is further disposed in the flow path 21, a site where heat can be released in the pressurizing chamber 2 is increased, and therefore, the working fluid 4 can be more efficiently heated. Thus, in this case, the heat transmission to the working fluid 4 can be further improved, and the actuation efficiency of the fluid heating device 1 can be further improved while the high flowability of the working fluid 4 is maintained. Thus, when the combustion device 6 of the fluid heating device 1 is connected to, for example, the internal-combustion engine 11 (see FIG. 1B), the working fluid 4 can be sent to the combustion device 6 with the flowability of the working fluid 4 being high, and thus, the combustion efficiency can also be improved. When the combustion efficiency of the working fluid 4 is improved, the actuation efficiency of the internal-combustion engine 11 can also be improved.

Note that in FIG. 1A, the common rail 20 has four discharge ports 20b to 20e corresponding to four injectors or combustion devices, or a 4-cylinder engine. However, the number of discharge ports is not limited to four but may accordingly be determined in accordance with the kind and the application of the device. For example, the common rail 20 may have a plurality of (e.g., six) discharge ports to be compatible with a multicylinder (e.g., a 6-cylinder) engine or may have one discharge port to be compatible with a single cylinder engine. Moreover, in FIG. 1A, the arrangement of the corresponding cylinders is a series arrangement but is not limited to this example. The corresponding cylinders may be arranged, for example, in a V shape or in the horizontal direction. Moreover, in FIG. 1A, for simplification, the combustion device 6 is connected to only one discharge port (in FIG. 1A, the discharge port 20b) of the four discharge ports 20b to 20e of the common rail 20. However, the combustion devices 6 may be provided to respective cylinders of the internal-combustion engine 11 described later, that is, the combustion device 6 can be connected to each of other discharge ports (in FIG. 1A, the discharge ports 20c to 20e) in a similar manner.

Thus, in the fluid heating device 1 of the present embodiment, the high flowability of the working fluid 4 can be maintained, and therefore, when the fluid heating device 1 is adopted in a system including an internal-combustion engine (engine) and the like, the motor system 10 excellent in the actuation efficiency can be configured. In particular, the fluid heating device 1 can suitably configure a common rail system for a diesel engine.

(2-4) Working Fluid

The working fluid 4 is a fluid that flows within the pressurizing chamber 2. The working fluid 4 may be a liquid, may be a gas, or may be a mixture of a liquid and a gas. That is, the working fluid 4 includes at least one of the liquid or the gas. The working fluid 4 includes fuel, a hydraulic oil, or the like as the liquid, and/or includes, for example, air, methane, propane, acetylene, hydrogen, or a natural gas as the gas. Thus, the working fluid 4 includes at least one kind of fluid selected from the group consisting of the liquid and the gas mentioned above.

When the working fluid 4 is the fuel 40 described in (3-1) below, combusting the working fluid 4 in the combustion device 6 can provide heat (heat quantity) due to combustion energy during the combustion. That is, the fuel 40 is fuel that can provide energy from heat as combustion heat resulting from combustion thereof. The fuel 40 includes at least one of, for example, liquid fuel or gas fuel. Examples of the liquid fuel include: petroleum-derived fuel such as gasoline, light oil (diesel), kerosine, and heavy oil; alcohols; and lipids. Examples of the gas fuel include: a carbon hydride-based gas such as methane, propane, butane, and acetylene; hydrogen; carbon monoxide; ammonia; dimethyl ether; and a natural gas (a mixed gas of carbon hydride-based gases) which are in a gas state at an ordinary temperature and under an ordinary pressure.

Moreover, when the working fluid 4 is the hydraulic oil 400 described in (4-1) below, a driving device or the like can be operated by giving hydraulic power to the working fluid 4 by the pressurizing device 5 or the like. That is, the hydraulic oil 400 has a function of transmitting the hydraulic power.

(2-5) Pressurizing Device

The fluid heating device 1 of the present embodiment further includes the pressurizing device 5. The pressurizing device 5 is a device configured to apply a pressure to the working fluid 4. Thus, in the fluid heating device 1, the working fluid 4 can be efficiently pressurized by the pressurizing device 5, and therefore, the heat transmission to the working fluid 4 can be further improved, and the flowability of the working fluid 4 can be improved.

The configuration of the pressurizing device 5 is not particularly limited, but any configuration for pressurizing the fluid may be adopted, and the pressurizing device 5 may be, for example, a high-pressure pump configured to output a high pressure. In the present embodiment, for example, the pressurizing device 5 is a high-pressure pump configured to increase the pressure of the working fluid 4 to about 200 MPa or higher.

(2-6) Others

The fluid heating device 1 may include the combustion device 6. When the working fluid 4 includes the fuel 40, the fuel 40 is a fluid to be supplied to the combustion device 6. Thus, in the fluid heating device 1, the working fluid 4 (the fuel 40) is combusted to generate heat, and by using the heat, power can be given to a device such as a driving device connected to, for example, the combustion device 6.

The combustion device 6 includes, for example, a fuel injection device and a combustion mechanism. The fuel injection device is, for example, an injector. The combustion mechanism includes, for example, a combustion chamber. The combustion device 6 is configured to combust the working fluid 4 in the combustion chamber by injecting the working fluid 4 to the combustion chamber by the injection device. In the fluid heating device 1 of the present embodiment, the flowability of the working fluid 4 (the fuel 40) can be favorably improved by the fluid heating device 1 even when the combustion device 6 is provided, and therefore, the actuation efficiency of the combustion device 6 can also be improved. Thus, the fluid heating device 1 can be improved in the actuation efficiency and the operating performance of the combustion device 6. Note that when the fluid heating device 1 includes no combustion device 6, the fluid heating device 1 is at least configured such that the working fluid 4 discharged through the discharge ports 20b to 20e of the pressurizing chamber 2 returns to the pressurizing device 5, the fluid supply device 7, and the like via the discharge flow path 21b and the like.

The fluid heating device 1 may include the fluid supply device 7. The fluid supply device 7 is, for example, configured to supply the working fluid 4 to the pressurizing device 5 and to receive the working fluid 4 leaking from the pressurizing chamber 2.

The fluid heating device 1 may include other components. For example, a manometer having a pressure sensor for sensing the pressure in the pressurizing chamber 2 may be provided in the pressurizing chamber 2 of the fluid heating device 1.

To the fluid heating device 1, a control device 8 for controlling the pressure of, for example, the pressurizing chamber 2 or the pressurizing device 5 may be connected. The control device 8 includes, as a main component, for example, a microcontroller having a memory and one or more processors. The microcontroller can cause the one or more processors to execute a program stored in the memory of the microcontroller to implement a function as the control device 8. The program may be stored in the memory of the microcomputer in advance, provided by a non-transitory recording medium such as a memory card storing the program, or provided via a telecommunications network.

The control device 8 is connected to, for example, the common rail 20 of the pressurizing chamber 2 and detects the pressure in the common rail 20 to control the discharge amount from the discharge ports 20b to 20e. Moreover, the control device 8 controls, for example, the pressure of the pressurizing device 5 to control the supply volume, supply pressure, and the like of the working fluid 4 supplied from the supply flow path 21a to the common rail 20. Furthermore, the control device 8 controls, for example, a process of causing the combustion device 6 to combust the working fluid 4 supplied from the common rail 20 or to discharge the working fluid 4 so that the working fluid 4 circulates.

(2-7) Operation of Fluid Heating Device

Operation of the fluid heating device 1 of the present embodiment will be described with reference to FIG. 1A.

In the fluid heating device 1 of the present embodiment, when the working fluid 4 is sent out of the pressurizing device 5, the working fluid 4 passes through the flow path 21 (the supply flow path 21a) and is supplied via the supply port 20a to the common rail 20. The working fluid 4 supplied to the common rail 20 flows within the common rail 20, is discharged from any one discharge port of the discharge ports 20b to 20e of the common rail 20, and is sent through the flow path 21 (the discharge flow path 21b) to the combustion device 6.

Since the working fluid 4 is sent out of the pressurizing device 5 in a state where the working fluid 4 is highly pressurized, the temperature of the working fluid 4 increases. At this time, the working fluid 4 is in the pressurized state and gives a pressure to the heat accumulator 3 of the supply flow path 21a and the heat accumulator 3 of the common rail 20 in the pressurizing chamber 2. The heat accumulator 3 receiving the pressure from the working fluid 4 radiates heat, thereby releasing the heat around the heat accumulator 3. Thus, the heat released from the heat accumulator 3 is given to the working fluid 4. The working fluid 4 flows as described above as long as the pressurizing device 5 is operating. Therefore, while the working fluid 4 flows, the heat accumulator 3 accumulates heat and the heat accumulator 3 can continuously give heat to the working fluid 4 when receiving a prescribed pressure. Therefore, heat obtained from the heat accumulator 3 warms the working fluid 4. Thus, the working fluid 4 can maintain high flowability from the pressurizing device 5 to the combustion device 6. Moreover, in this case, the working fluid 4 has high flowability also when the working fluid 4 is injected in the combustion device 6 and is combusted. Therefore, when the working fluid 4 is atomized by injection, a plurality of particles of the working fluid 4 are less likely to be collected to form a single aggregate, and thus, cinders and the like are less likely to remain in the combustion device 6 at the time of combustion. Thus, also when the fluid heating device 1 causes the working fluid 4 to flow to be sent to the combustion device 6, the actuation efficiency of the fluid heating device 1 is less likely to be reduced.

As described above, improving the heat transmission to the working fluid 4 and improving the flowability of the fluid can improve the actuation efficiency and maintain the good operating performance of the fluid heating device 1. The fluid heating device 1 is suitable to the motor system 10, the movable object 12, and the hydraulic system 100.

(3-1) Motor System

Next, the configuration of the motor system 10 of the present embodiment will be described with reference to FIG. 1B.

As described above, the motor system 10 includes the fluid heating device 1 and the internal-combustion engine 11 described above. In the fluid heating device 1, components substantially the same as those described in (2-1) are denoted by the same reference signs, and the repeated description thereof is omitted.

The motor system 10 is applicable to, for example, an electricity-generating system such as an electric generation plant; a self-propelled agricultural machine such as a stationary grain threshing machine, an agricultural pump, a tractor, and a harvester; and an engine system of construction machinery such as an excavator (e.g., a shovel loader) and a crane car for work such as civil engineering and construction. Moreover, the motor system 10 is applicable to engine systems and the like of marine vessels; aircraft; and motor vehicles such as passenger cars, buses, and large-size vehicles.

In the motor system 10 of the present embodiment, the working fluid 4 is preferably the fuel 40. As described above, the fuel 40 is combusted in the combustion device 6, thereby generating heat. The fuel 40 includes at least one of, for example, liquid fuel or gas fuel. Examples of the liquid fuel include: petroleum-derived fuel such as gasoline, light oil (diesel), kerosine, and heavy oil; alcohols; and lipids. Examples of the gas fuel include: a carbon hydride-based gas such as methane, propane, butane, and acetylene; hydrogen; carbon monoxide; ammonia; dimethyl ether; and a natural gas (a mixed gas of carbon hydride-based gases) which are in a gas state at an ordinary temperature and under an ordinary pressure such as.

As illustrated in FIG. 1B, the internal-combustion engine 11 includes the combustion device 6 described in (2-6) above. Specifically, the internal-combustion engine 11 at least includes the combustion device 6 and a driver configured to perform driving by using, as power, combustion heat generated in the combustion device 6. Thus, the internal-combustion engine 11 has a function of combusting the fuel 40, which is the working fluid 4, to convert the combustion heat into mechanical energy so as to obtain mechanical power. Examples of the internal-combustion engine 11 include a motor and an engine. The internal-combustion engine 11 is at least accordingly designed in accordance with the configuration of the fluid heating device 1. Examples of the internal-combustion engine 11 include a Diesel Engine and a Gasoline Engine.

The operation of the motor system 10 will be described. Since the motor system 10 includes the fluid heating device 1, the working fluid 4 pressurized by the pressurizing device 5 of the fluid heating device 1 and discharged from the pressurizing chamber with the pressurized state being maintained is supplied to the internal-combustion engine 11. The internal-combustion engine 11 generates mechanical power by using, as power, combustion energy generated when the working fluid 4 which is compressed is injected and combusted in the combustion device 6. At this time, the flowability of the working fluid 4 is kept high, and therefore, the working fluid 4 is less likely to reduce the actuation efficiency of the motor system 10 including the internal-combustion engine 11. Thus, improving the heat transmission to the working fluid 4 and improving the flowability of the working fluid 4 can improve the actuation efficiency and maintain the good operating performance of the motor system 10.

The motor system 10 is suitable to the movable object 12 including the common rail system.

(3-2) Movable Object

The movable object 12 according to the present embodiment includes the motor system 10 described above. The movable object 12 is configured to be movable by using, as power, mechanical energy obtained mainly from the internal-combustion engine 11. Examples of the movable object 12 include vehicles, railroad vehicles, marine vessels, and aircraft, or movable agricultural machines, and construction machinery of those described in connection with the motor system 10.

The movable object 12 according to the present embodiment includes the motor system 10. In FIG. 1B, the movable object 12 includes the fluid heating device 1 and the internal-combustion engine 11. The movable object 12 further includes an access pedal 13 configured to move the movable object 12 and the control device 8 which is an Engine Control Unit (ECU) for controlling each components of the movable object 12. Operation of the fluid heating device 1 and the motor system 10 is as described above. In the movable object 12, the fuel 40 is combusted in the combustion device 6 in the motor system 10, and the internal-combustion engine 11 obtains the combustion energy resulting from the combustion of the fuel 40, and thereby, the internal-combustion engine 11 converts the combustion energy to machine energy. At this time, when the access pedal 13 is operated, the movable object 12 can be operated by using the machine energy from the internal-combustion engine 11 in linkage with control by the control device 8.

In the movable object 12 of the present embodiment, the fuel 40 can be maintained at a high temperature by heat released from the heat accumulator 3 in the pressurizing chamber 2, and therefore, the flowability of the fuel 40 can be kept high. Thus, also when the movable object 12 starts operating, the actuation efficiency of the motor system 10 is less likely to be lowered, and the movable object 12 can be stably operated. That is, the movable object 12 having excellent actuation efficiency and good operating performance can be embodied.

(4-1) Hydraulic System

Next, the configuration of the hydraulic system 100 including the fluid heating device 1 described above will be described with reference to FIG. 1C. Thick lines in FIG. 1C represent fluid feed pipes 211 and indicate sites where the hydraulic oil 400, which is the working fluid, has a high pressure.

As described above, the hydraulic system 100 includes the fluid heating device 1. In the present embodiment, the working fluid 4 is the hydraulic oil 400. Since the hydraulic system 100 includes the fluid heating device 1 described above, the heat accumulator 3 disposed in the pressurizing chamber 2 releases heat by receiving the pressure from the hydraulic oil 400 in the pressurized state, thereby warming the hydraulic oil 400. Thus, the flowability of the hydraulic oil 400 can be improved, and the performance of the hydraulic system 100 can be improved Therefore, the hydraulic system 100 can improve the heat transmission to the hydraulic oil 400, thereby reducing heat loss from the heat accumulator 3. Improving the heat transmission to the hydraulic oil 400 and improving the flowability of the fluid can improve the actuation efficiency and maintain the good operating performance. Thus, in the hydraulic system 100, the actuation efficiency of the driver 600, which is the driving device, can be improved.

Specifically, the hydraulic system 100 includes the fluid heating device 1 and the driver 600. The fluid heating device 1 at least includes the pressurizing device 5, the fluid supply device 7, an electric motor 91 configured to operate the pressurizing device 5, and a manometer 92 configured to adjust the pressure of the hydraulic oil 400.

The pressurizing chamber 2 includes a direction control valve 200, a pressure control valve 201, a flow rate control valve 202, and a plurality of flow paths 210. The plurality of flow paths 210 include a plurality of fluid feed pipes 211 and a plurality of fluid discharge pipes 212. The heat accumulator 3 is disposed in at least some of the direction control valve 200, the pressure control valve 201, the flow rate control valve 202, and the flow paths 210 included in the pressurizing chamber 2. The direction control valve 200, the pressure control valve 201, and the flow rate control valve 202 are also referred to as fluid pressure valves, and the fluid pressure valves may be controlled electromagnetically or mechanically.

The plurality of fluid feed pipes 211 include fluid feed pipes 211a and 211b. The plurality of fluid discharge pipes 212 include fluid discharge pipes 212a, 212b, and 212c. Of the plurality of fluid feed pipes 211, the fluid feed pipe 211a connects the pressurizing device 5 to the direction control valve 200, and the fluid feed pipe 211b connects the direction control valve 200 to the driving device (the driver 600). On the other hand, of the plurality of fluid discharge pipes 212, the fluid discharge pipe 212a connects the driver 600 to the flow rate control valve 202, the fluid discharge pipe 212b connects the flow rate control valve 202 to the direction control valve 200, and the fluid discharge pipe 212c connects the direction control valve 200 to the fluid supply device 7. The manometer 92 is a device connected to the pressure control valve 201 via the flow path 210 (the fluid feed pipe 211) and configured to indicate the pressure state in the hydraulic system 100.

The hydraulic oil 400 is a medium that transmits power in the hydraulic system 100. The hydraulic oil 400 is at least accordingly determined in accordance with the configuration, application, and the like of the hydraulic system 100. Examples of the hydraulic oil 400 include a petroleum-derived hydraulic oil, a synthetic hydraulic oil, a water solubility hydraulic oil, a biodegradable hydraulic oil, and a high moisture content operating fluid. Examples of the petroleum-derived hydraulic oil include a general hydraulic oil, an abrasion resistance hydraulic oil, and a high viscosity index hydraulic oil.

The pressurizing device 5 is a device configured to send the hydraulic oil 400 out of the fluid supply device 7 and send the hydraulic oil 400 to the pressurizing chamber 2. The pressurizing device 5 is, for example, a fluid pressure pump. Examples of the fluid pressure pump include a constant volume pump such as a gear pump and a vane pump. The electric motor 91 is electrically connected the pressurizing device 5, and driving the electric motor 91 can operate the pressurizing device 5. Moreover, in the flow path (the fluid feed pipe 211c) connecting the pressurizing device 5 to the fluid supply device 7, a filter 93 is connected between the pressurizing device 5 and the fluid supply device 7. The filter 93 is, for example, a device configured to remove an impurity such as dust in the hydraulic oil 400.

The driver 600 has a function of converting, into mechanical power, hydraulic power obtained by the pressure of the hydraulic oil 400 thus supplied. The driver 600 includes a cylinder 601, a piston rod 602, and a piston 603. In the hydraulic system 100, when the hydraulic oil 400 is applied to, for example, the direction control valve 200 while the hydraulic oil 400 supplied from the pressurizing device 5 passes through the fluid feed pipes 211 (211a, 211b) and the direction control valve 200, the heat accumulator 3 can release heat. This heat can warm the hydraulic oil 400 and can thus improve the flowability of the hydraulic oil 400. Then, the hydraulic oil 400 is supplied into the cylinder 601 of the driver 600, and the piston rod 602 and the piston 603 are pushed back in a direction opposite to a direction in which the hydraulic oil 400 flows. At this time, the hydraulic oil 400 can be improved in flowability in the pressurizing chamber 2 and can thus improve the operating performance of the driver 600.

(5) Variations

The embodiment described above is a mere example of various embodiments of the present disclosure. That is, the embodiment described above may be modified in various manners depending on design without departing from the scope of the present disclosure. Drawings shown in the embodiment described above are mere conceptual views for illustrating an example of the fluid heating device 1, the motor system 10, the hydraulic system 100, and the heat accumulator 3 (the heat accumulating member 30). Thus, the shape, the dimension, the positional relationship, and the like of each component may be accordingly different from those of the actual fluid heating device 1, the motor system 10, the hydraulic system 100, and the heat accumulator 3 (the heat accumulating member 30).

Variations of the embodiment described above will be described below.

The fluid heating device 1 at least includes: the pressurizing chamber 2 configured to store the working fluid 4; and the heat accumulator 3 disposed in the pressurizing chamber 2, and the fluid heating device 1 is at least configured such that the heat accumulator 3 includes the heat accumulating member 30 configured to release heat by receiving the pressure applied to the working fluid 4. As long as the configuration is satisfied, for example, the fluid heating device 1 is not limited to the configuration including the pressurizing device 5 configured to apply a pressure to the working fluid 4. In this case, the working fluid 4 may be configured to apply a pressure from a device other than the pressurizing device 5. Moreover, the fluid heating device 1 is not limited to a configuration in which the pressurizing chamber 2 includes the common rail 20, but the pressurizing chamber 2 does not have to include common rail 20. Also in these cases, the working fluid 4 is warmed by heat released from the heat accumulator 3 and can be improved in flowability.

Moreover, the heat accumulator 3 is at least a component to be disposed in the pressurizing chamber 2. Thus, for example, when the pressurizing chamber 2 includes the common rail 20 and the flow path 21, the heat accumulator 3 is at least disposed in one of the common rail 20 or the flow path 21. For example, the heat accumulator 3 may be disposed only in the common rail 20, may be disposed only in the flow path 21, or heat accumulators 3 may be disposed in the common rail 20 and the flow path 21. Moreover, when the flow path 21 includes a plurality of flow paths, for example, the heat accumulators 3 may be disposed in all of the flow paths or may be disposed in some of the flow paths.

Moreover, the heat accumulator 3 does not necessarily have to be configured to absorb heat from the working fluid 4 but may be, for example, configured not to absorb heat from the working fluid 4. Also in this case, the heat accumulator 3 can release heat by receiving the pressure of the working fluid 4, can thus warm the working fluid 4, and can contribute to an improvement in the flowability of the working fluid 4. Moreover, the heat accumulator 3 may be, for example, an accumulator that absorbs heat from a fluid other than the working fluid 4. Moreover, a supply source of the heat when the heat accumulator 3 absorbs heat is not limited to the working fluid 4. The supply source of the heat may be, for example, a heating device or the like configured to externally warm the pressurizing chamber 2 or may be, for example, a preheating device (a preheater) disposed in a flow path through which the working fluid 4 flows.

Moreover, the fluid heating device 1 is not limited to the configuration in which the working fluid 4 is the fuel 40, but, for example, the working fluid 4 is at least a fluid that flows within the pressurizing chamber 2. Moreover, the fluid heating device 1 is not limited to the configuration including the combustion device 6, but the fluid heating device 1 does not have to include the combustion device 6. In this case, the fluid heating device 1 may be configured, for example, such that the fluid (the working fluid 4) that flows in the pressurizing chamber 2 circulates within the pressurizing chamber 2. Also in this case, heat released from the heat accumulator 3 can warm the working fluid 4, thereby improving the flowability of the working fluid 4.

Moreover, the configuration of the motor system 10 is not limited to this example as long as the motor system 10 includes the fluid heating device 1 and the internal-combustion engine 11. The motor system 10 may include, for example, a preheating device (a preheater) configured to heat the working fluid 4 in advance, an evaporation device configured to evaporate the working fluid 4, and an overheating device configured to overheat the working fluid 4 which has been evaporated. The flowability of the working fluid 4 can be improved also in this case because the configuration of the motor system 10 includes the fluid heating device 1 described above. Thus, the motor system 10 is excellent in actuation efficiency and can have good operating performance.

Moreover, the movable object 12 at least includes the motor system 10.

Moreover, the hydraulic system 100 at least includes the fluid heating device 1 and the hydraulic oil 400 as the working fluid 4. The flowability of the hydraulic oil 400 can be improved also in this case because the configuration of the motor system 10 includes the fluid heating device 1 described above. Thus, the hydraulic system 100 is excellent in actuation efficiency and can have good operating performance.

(6) Summary

As described above, a fluid heating device (1) of a first aspect of the present disclosure includes a pressurizing chamber (2) configured to store a working fluid (4) and a heat accumulator (3) disposed in the pressurizing chamber (2). The heat accumulator (3) includes a heat accumulating member (30) configured to release heat by receiving a pressure applied to the working fluid (4).

This configuration enables heat transmission to the working fluid (4) to be improved and the flowability of the working fluid (4) to be improved. This enables the fluid heating device (1) to be improved in actuation efficiency, so that the fluid heating device (1) yields good operating performance.

A fluid heating device (1) of a second aspect of the present disclosure referring to the first aspect further includes a pressurizing device (5) configured to apply a pressure to the working fluid (4).

This configuration enables the working fluid (4) to be efficiently pressurized by the pressurizing device (5), which enables heat transmission to the working fluid (4) to be further improved and the flowability of the working fluid (4) to be improved.

In a fluid heating device (1) of a third aspect of the present disclosure referring to the first or second aspect, the heat accumulating member (30) is configured to absorb heat from the working fluid (4).

According to this configuration, the heat accumulator (3) releases heat by the pressure of the working fluid (4) and, in addition, absorbs the heat of the working fluid (4), and thus, the heat accumulator (3) is configured to repeat absorbing and releasing of heat. This enables the heat accumulator (3) to more efficiently transmit heat to the working fluid (4) and to improve the flowability of the working fluid (4).

A fluid heating device (1) of a fourth aspect of the present disclosure referring to any one of the first to third aspects further includes a combustion device (6), wherein the working fluid (4) includes a fuel (40) to be supplied to the combustion device (6).

With this configuration, improving the heat transmission to the working fluid (4) and improving the flowability of the working fluid (4) enables the fluid heating device (1) to be improved in actuation efficiency, so that the fluid heating device (1) yields good operating performance. Moreover, the fuel (40) can be efficiently supplied to the combustion device (6).

In a fluid heating device (1) of a fifth aspect of the present disclosure referring to any one of the first to fourth aspects, the heat accumulating member (30) includes trititanium pentoxide.

With this configuration, the heat accumulator (3) can accumulate and release heat by the phase transition of the trititanium pentoxide by the pressure and the heat of the working fluid (4). This enables the fluid heating device (1) to be further improved in actuation efficiency and to maintain better operating performance.

In a fluid heating device (1) of a sixth aspect of the present disclosure referring to any one of the first to fourth aspects, the heat accumulating member (30) includes substitutional trititanium pentoxide.

With this configuration, the heat accumulator (3) can accumulate and release heat by the phase transition of the substitutional trititanium pentoxide by the pressure and the heat of the working fluid (4). This enables the fluid heating device (1) to be further improved in actuation efficiency and to maintain better operating performance.

A fluid heating device (1) of a seventh aspect of the present disclosure referring to any one of the first to sixth aspects includes a hollow member in which a pressurizing chamber (2) is formed. The heat accumulator (3) is provided to an inner peripheral surface (2a) of the hollow member.

This configuration enables the heat accumulator (3) to be more easily receive the pressure from the working fluid (4), to be improved in heat transmission to the working fluid (4), and to be improved in flowability of the working fluid (4). Thus, the fluid heating device (1) yields good operating performance.

In a fluid heating device (1) of an eighth aspect of the present disclosure referring to any one of the first to seventh aspects, the heat accumulating member (30) is in bulk form.

This configuration enables the heat accumulator (3) to be more easily receive the pressure from the working fluid (4), to be improved in heat transmission to the working fluid (4), and to be improved in flowability of the working fluid (4). Thus, the fluid heating device (1) yields good operating performance.

In a fluid heating device (1) of a ninth aspect of the present disclosure referring to any one of the first to eighth aspects, the heat accumulator (3) includes a plurality of the heat accumulating members (30), and each of the plurality of heat accumulating members (30) is in granular form.

With this configuration, the area in which the heat accumulator (3) comes into contact with the working fluid (4) increases, which enables the heat accumulator (3) to more easily receive the pressure from the working fluid (4). This enables heat transmission to the working fluid (4) to be improved and the flowability of the working fluid (4) to be improved.

In a fluid heating device (1) of a tenth aspect of the present disclosure referring to any one of the first to ninth aspects, the heat accumulating member (30) is in mesh form.

With this configuration, the area in which the heat accumulator (3) comes into contact with the working fluid (4) increases, which enables the heat accumulator (3) to more easily receive the pressure from the working fluid (4). This enables heat transmission to the working fluid (4) to be improved and the flowability of the working fluid (4) to be improved In a fluid heating device (1) of an eleventh aspect of the present disclosure referring to any one of the first to tenth aspects, the heat accumulating member (30) is a porous member.

With this configuration, the area in which the heat accumulator (3) comes into contact with the working fluid (4) increases, which enables the heat accumulator (3) to more easily receive the pressure from the working fluid (4). This enables heat transmission to the working fluid (4) to be improved and the flowability of the working fluid (4) to be improved.

In a fluid heating device (1) of a twelfth aspect of the present disclosure referring to any one of the first to eleventh aspects, the heat accumulating member (30) is movable within the pressurizing chamber (2).

With this configuration, the contact proportion in which the heat accumulator (3) comes into contact with the working fluid (4) increases, which enables the heat accumulator (3) to more easily receive the pressure from the working fluid (4). This enables heat transmission to the working fluid (4) to be improved and the flowability of the working fluid (4) to be improved.

In a fluid heating device (1) of a thirteenth aspect of the present disclosure referring to any one of the first to twelfth aspects, the pressurizing chamber (2) includes a common rail (20).

This configuration enables the flowability of the working fluid (4) in the fluid heating device (1) to be improved. Moreover, a common rail system, in particular, a common rail system for a diesel engine can be constructed by improving the actuation efficiency of the fluid heating device (1).

The motor system (10) of a fourteenth aspect of the present disclosure includes the fluid heating device (1) of any one of the first to thirteenth aspects and an internal-combustion engine (11).

This configuration enables the fluid heating device (1) to be improved in actuation efficiency, so that the fluid heating device (1) yields good operating performance. Thus, the motor system (10) having excellent actuation efficiency and good operating performance can be constructed.

The movable object (12) of a fifteenth aspect of the present disclosure includes the motor system (10) of the fourteenth aspect.

With this configuration, the movable object (12) which is excellent actuation efficiency and which has good operating performance can be embodied.

A hydraulic system (100) according to a sixteenth aspect of the present disclosure includes the fluid heating device (1) of any one of the first to thirteenth aspects, wherein the working fluid (4) is a hydraulic oil (400).

This configuration enables the fluid heating device (1) to be improved in actuation efficiency, so that the fluid heating device (1) yields good operating performance. Thus, the hydraulic system (100) which is excellent in actuation efficiency and has good operating performance can be constructed.

REFERENCE SIGNS LIST

1 FLUID HEATING DEVICE
2 PRESSURIZING CHAMBER
20 COMMON RAIL
21 FLOW PATH
3 HEAT ACCUMULATOR
30 HEAT ACCUMULATING MEMBER
4 WORKING FLUID
5 PRESSURIZING DEVICE
6 COMBUSTION DEVICE
7 FLUID SUPPLY DEVICE
8 CONTROL DEVICE
10 MOTOR SYSTEM
11 INTERNAL-COMBUSTION ENGINE
12 MOVABLE OBJECT
100 HYDRAULIC SYSTEM
400 HYDRAULIC OIL

The invention claimed is:

1. A fluid heating device, comprising:
a pressurizing chamber configured to store a working fluid; and
a heat accumulator disposed in the pressurizing chamber, wherein:
the heat accumulator includes a heat accumulating member configured to release heat by receiving a pressure applied to the working fluid,
the heat thus released is given to the working fluid,
the heat accumulating member includes substitutional trititanium pentoxide, and
a substitutional atom in the substitutional trititanium pentoxide is at least one kind of atoms selected from the group consisting of Hf, Zr, Si, Sc, and Y.

2. The fluid heating device of claim 1, further comprising a pressurizing device configured to apply a pressure to the working fluid.

3. The fluid heating device of claim 1,
the heat accumulating member is configured to absorb heat from the working fluid.

4. The fluid heating device of claim 1, wherein
the working fluid includes fuel to be supplied to a combustion device.

5. The fluid heating device of claim 1, further comprising a hollow member in which the pressurizing chamber is formed, wherein
the heat accumulator is provided to an inner peripheral surface of the hollow member.

6. The fluid heating device of claim 1, wherein
the heat accumulating member is in bulk form.

7. The fluid heating device of claim 1, wherein
the heat accumulator includes a plurality of the heat accumulating members, and
each of the plurality of heat accumulating members is in granular form.

8. The fluid heating device of claim 1, wherein
the heat accumulating member is in mesh form.

9. The fluid heating device of claim 1, wherein
the heat accumulating member is a porous member.

10. The fluid heating device of claim 1, wherein
the heat accumulating member is movable within the pressurizing chamber.

11. The fluid heating device of claim 1, wherein
the pressurizing chamber includes a common rail.

12. A motor system, comprising:
the fluid heating device of claim 1; and
an internal-combustion engine to which the working fluid is supplied.

13. A movable object, comprising
the motor system of claim 12,
wherein the movable object is configured to be movable by using, as power, mechanical energy obtained from the internal-combustion engine.

14. A hydraulic system, comprising
the fluid heating device of claim 1,
wherein the working fluid is a hydraulic oil.

* * * * *